(12) United States Patent
Yang

(10) Patent No.: US 8,551,660 B2
(45) Date of Patent: *Oct. 8, 2013

(54) RESERVE POWER SUPPLY WITH ELECTRODE PLATES JOINED TO AUXILIARY CONDUCTORS

(76) Inventor: Tai-Her Yang, Dzan-Hwa (TW)

( * ) Notice: Subject to any disclaimer, the term of this patent is extended or adjusted under 35 U.S.C. 154(b) by 691 days.

This patent is subject to a terminal disclaimer.

(21) Appl. No.: 12/627,181

(22) Filed: Nov. 30, 2009

(65) Prior Publication Data

US 2011/0129721 A1    Jun. 2, 2011

(51) Int. Cl.
*H01M 4/00*    (2006.01)
(52) U.S. Cl.
USPC ........... 429/244; 429/144; 429/161; 429/162; 429/211; 429/234; 429/237
(58) Field of Classification Search
USPC .................................. 429/129–162, 208–255
See application file for complete search history.

(56) References Cited

U.S. PATENT DOCUMENTS

| | | | | |
|---|---|---|---|---|
| 4,007,472 A * | 2/1977 | Land | ............................. | 429/153 |
| 5,460,904 A * | 10/1995 | Gozdz et al. | ................... | 429/316 |
| 6,159,633 A * | 12/2000 | Yang | ............................. | 429/120 |
| 6,232,018 B1 * | 5/2001 | Zhao | ............................. | 429/235 |
| 6,531,247 B1 * | 3/2003 | Yang | ............................. | 429/211 |
| 2001/0021470 A1 * | 9/2001 | May et al. | ........................ | 429/44 |
| 2001/0036573 A1 * | 11/2001 | Jen et al. | ........................ | 429/144 |
| 2003/0013012 A1 * | 1/2003 | Ahn et al. | ........................ | 429/152 |
| 2005/0031911 A1 * | 2/2005 | Venkatesan et al. | ............... | 429/9 |
| 2006/0226757 A1 * | 10/2006 | Yang | ............................. | 313/414 |
| 2008/0274394 A1 * | 11/2008 | Schormann et al. | ............ | 429/50 |
| 2008/0318126 A1 * | 12/2008 | Ishii | ............................. | 429/223 |
| 2009/0075172 A1 * | 3/2009 | Ando et al. | .................... | 429/209 |
| 2009/0146607 A1 * | 6/2009 | Yang | ............................. | 320/103 |
| 2009/0214955 A1 * | 8/2009 | Utsunomiya et al. | ..... | 429/231.95 |
| 2009/0263709 A1 * | 10/2009 | Nakamura | ..................... | 429/152 |
| 2010/0136381 A1 * | 6/2010 | Yang | ............................. | 429/34 |
| 2010/0216027 A1 * | 8/2010 | Fujii | ............................. | 429/246 |
| 2010/0255362 A1 * | 10/2010 | Ogawa et al. | ................. | 429/145 |
| 2011/0177394 A1 * | 7/2011 | Yang | ............................. | 429/234 |
| 2011/0177396 A1 * | 7/2011 | Moriwaka et al. | ............ | 429/304 |

* cited by examiner

*Primary Examiner* — Basia Ridley
*Assistant Examiner* — James Erwin
(74) *Attorney, Agent, or Firm* — Bacon & Thomas, PLLC

(57) ABSTRACT

The present invention relates to one or more electrode plates, which are installed with current collecting terminals at two or more sides thereof, and joined to an auxiliary conductor made of a material having a conductivity that is higher than that of the electrode plates. Current collecting terminals are installed at two or more sides of the auxiliary conductor, for linking with current collecting terminals installed at two or more sides of the electrode plates, and at least one of linked terminals is used as a general current collecting terminal to output current to an external part or to receive input current from the external part. Finally, insulators installed between the auxiliary conductor and the electrode plates to constitute an electrode unit.

24 Claims, 19 Drawing Sheets

RESERVE POWER SUPPLY WITH ELECTRODE PLATES JOINED TO AUXILIARY CONDUCTORS

BACKGROUND OF THE INVENTION (a) Field of the Invention

The present invention relates to a reserve power supply with electrode plates joined to auxiliary conductors, wherein one or more electrode plates, which are installed with current collecting terminals at two or more sides thereof, are joined with an auxiliary conductor having a flat, strip, or mesh structure and made of a material and/or structure with a conductivity that is higher than that of the electrode plates. The current collecting terminals are installed at two or more sides of the auxiliary conductor, so that the auxiliary conductor terminals can be unilaterally or multilaterally parallel connected with current collecting terminals installed at two or more sides of the electrode plates, and which are to be used as general current current collecting terminals to output current to an external part or to receive input current from the external part. Insulators are installed between the auxiliary conductor and the electrode plates to constitute an electrode unit. The number of the above general current collecting terminals for inputting/outputting the collection current is one or more.

(b) Description of the Prior Art

The conventional reserve power supply, which may include a variety of primary batteries, rechargeable batteries, capacitors, or super capacitors, has an electrode plate that is usually installed with one or more current collecting terminals of same polarity on a single side. FIG. 1 is a schematic view showing an embodiment of the conventional electrode plate unilaterally installed with a current collecting terminal, in which each electrode plate (P100) is unilaterally installed with a current collecting terminal (T100) for the electrode plate performing the current collecting function of inputting/outputting current, or for connecting with another electrode plate in series or parallel; because the electrode plate is only unilaterally installed with a current collecting terminal for inputting/outputting current, the current density on the electrode plate is uneven at the electrode plate region of the neighboring current collecting terminal, another side of the electrode plate, and the electrode plate region more far away from the current collecting terminal (T100) when large currents are input or output. If two or more current collecting terminals are installed at the same side of the electrode plate, which is more progressive, the electrode plate will have two or more pathways for inputting/outputting current, and two or more current collecting terminals with same polarity that are linked in parallel through a conductor, but providing same side terminals only improves the uniformity of the input/output current density on the same side, and is useless with respect to the uneven input/output current density at another side of the electrode plate.

In addition, one or more current collecting terminals, which are individually outwardly extended, are installed at two or more sides of the electrode plate to provide a further improvement. FIG. 2 is a schematic view showing an embodiment, in which the two sides of the electrode plate are individually installed with a current collecting terminals; or one or more sides of the electrode plate (P100) are installed with two or more current collecting terminals (T100) for forming two or more pathways for inputting/outputting current to reduce the resistance. FIG. 3 is a schematic view showing two current collecting terminals installed at each of the opposite sides of the electrode plate. Although the embodiments shown in FIG. 2 and FIG. 3 improve the uniformity of the input/output current density, they are still inconvenient to use with input/output terminals installed at the two sides.

SUMMARY OF THE INVENTION

The present invention relates to a reserve power supply with electrode plates joined to auxiliary conductors to form positive and negative electrodes of reserve power supplies such as primary batteries, rechargeable batteries, capacitors, or super capacitors, or of fuel cells with electrode plates. The above device is installed with anode auxiliary conductors, in which one or more anode electrode plates are installed with at least one current collecting terminal at each of two or more sides thereof and joined to an anode auxiliary conductor having a flat shape, strip, or mesh structure and made of a material and/or structure with conductivity higher than that of the electrode plates. At least one current collecting terminal is installed at each of two or more sides of the anode auxiliary conductor, for unilateral or multilateral parallel linking with the current collecting terminals installed at two or more sides of the anode electrode plates, and which are used provide a general current collecting anode terminal to output current to an external part or to receive input current from the external part. Insulators are installed between the anode auxiliary conductor and the anode electrode plates to constitute a positive electrode unit; and the number of the above anode general current collecting terminals for inputting/outputting the collection current is one or more.

Also, the above device is installed with cathode auxiliary conductors, in which one or more cathode electrode plates are installed with at least one current collecting terminal at each of two or more sides thereof and joined to an cathode auxiliary conductor having a flat shape, strip, or mesh structure and made of a material and/or structure with a conductivity higher than that of the electrode plates; and in which at least one current collecting terminal is installed at each of two or more sides of the cathode auxiliary conductor for unilateral or multilateral parallel linking with the current collecting terminals installed at two or more sides of the cathode electrode plates, the linked terminals being used as general current collecting cathode terminals to output current to the external part or to receive input current from the external part with insulators being installed between the cathode auxiliary conductor and the cathode electrode plates to constitute a negative electrode unit. The number of the above-described general current collecting cathode terminals for inputting/outputting the collection current may be one or more.

DESCRIPTION OF MAIN COMPONENT SYMBOLS

Figure 1:
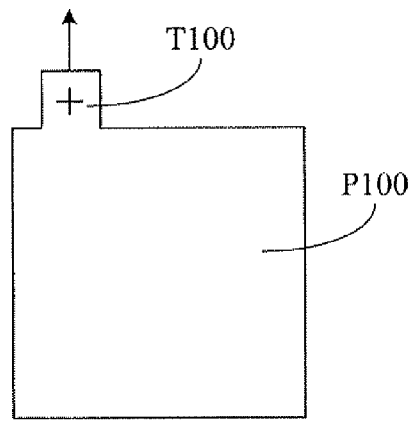
FIG. 1 is a schematic view showing an embodiment of a conventional electrode plate unilaterally installed with a current collecting terminal.

P100: Electrode plate
T100: Current collecting terminal
100: Auxiliary conductor
101: Side electrode plate
103: Insulator
104: Current collecting terminal
105: Input/output general current collecting terminal
120: Active substance
601: Current collecting terminal of the monolithic anode electrode plate 1031
602: Current collecting terminal of the monolithic cathode electrode plate 1032
1001: Anode auxiliary conductor
1002: Cathode auxiliary conductor
1011: Anode side electrode plate
1012: Cathode side electrode plate
1020: Isolating body
1030: Electrode tank
1031: Monolithic anode electrode plate
1032: Monolithic cathode electrode plate
1041: Anode current collecting terminal
1042: Cathode current collecting terminal
1051: Anode input/output general current collecting terminal
1052: Cathode input/output general current collecting terminal

DETAILED DESCRIPTION OF THE PREFERRED EMBODIMENTS

A conventional reserve power supply, which may include a variety of primary batteries, rechargeable batteries, capacitors, or super capacitors, includes an electrode plate usually installed with one or more current collecting terminals having a same polarity at a single side. FIG. 1 is a schematic view showing an embodiment of a conventional electrode plate unilaterally installed with a current collecting terminal, in which each electrode plate (P100) is unilaterally installed with a current collecting terminal (T100) to perform a current collecting function of inputting/outputting current, or for connecting with another electrode plate in series or parallel. Because the electrode plate is only unilaterally installed with a current collecting terminal for inputting/outputting current, the current density on the electrode plate is uneven at the electrode plate region of the neighboring current collecting terminal and the electrode plate region farther away from the current collecting terminal (T100) when large currents are input or output. If two or more current collecting terminals are installed at same side of the electrode plate, which is more progressive, the electrode plate will have two or more pathways for inputting/outputting current, and two or more current collecting terminals with same polarity linked in parallel through a conductor; but this two terminal, same side arrangement only improve the uniformity of the input/output current density on one side, and is useless with respect to the uneven input/output current density at the other side of the electrode plate.

Figure 2:
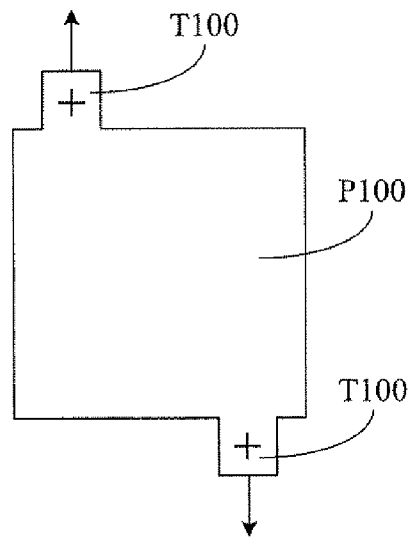
FIG. 2 is a schematic view showing an embodiment of a conventional electrode plate installed with a current collecting terminal at each of two sides.
Figure 3:
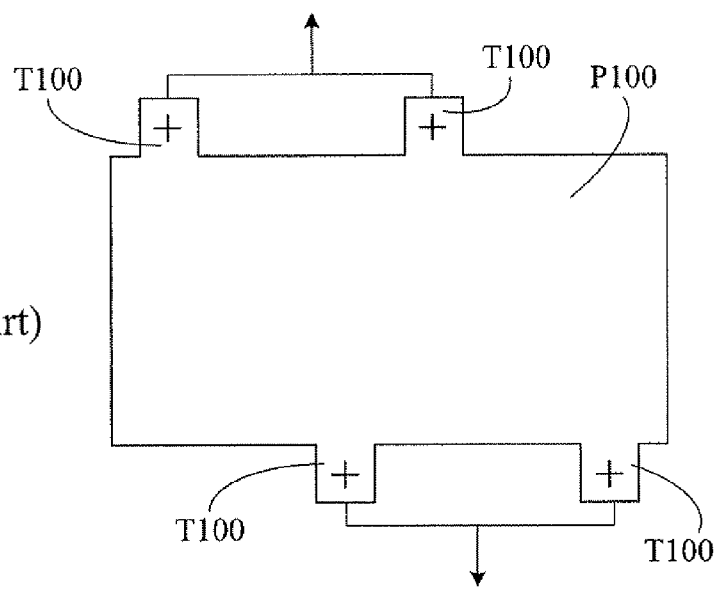
FIG. 3 is a schematic view showing an embodiment of a conventional electrode plate installed with two current collecting terminals at each of the opposite sides.

To provide improved uniformity, one or more current collecting terminals, which are individually outward extended, may be installed at two or more sides of the electrode plate. FIG. 2 is a schematic view showing an embodiment in which the two sides of the electrode plate are individually installed with a current collecting terminals; or one or more sides of the electrode plate (P100) are installed with two or more current collecting terminals (T100) for forming two or more pathways for inputting/outputting current to reduce the resistance, and FIG. 3 is a schematic view showing two current collecting terminals installed at each of the opposite sides of the electrode plate. Although the arrangements shown in FIG. 2 and FIG. 3 improve the uniformity of the input/output current density, the arrangements are still inconvenient to use with input/output terminals installed at the two sides.

The present invention relates to a reserve power supply with electrode plates joined to auxiliary conductors, wherein one or more electrode plates are installed with at least one current collecting terminal at each of two or more sides thereof, and which are joined to an auxiliary conductor having a flat shape, strip, or mesh structure, the auxiliary conductor being made of a material and/or structure with higher conductivity than that of the electrode plates; and in which at least one current collecting terminal is installed at each of two or more sides of the auxiliary conductor, for unilateral or multilateral parallel linking with the current collecting terminals installed at two or more sides of the electrode plates, the linked terminals being used as general current collecting terminals to output current to an external part or to receive the input current from the external part. Furthermore, according to the invention, insulators installed between the auxiliary conductor and the electrode plates to constitute an electrode unit, and the number of the above general current collecting terminals for inputting/outputting the collection current is one or more.

Figure 4:
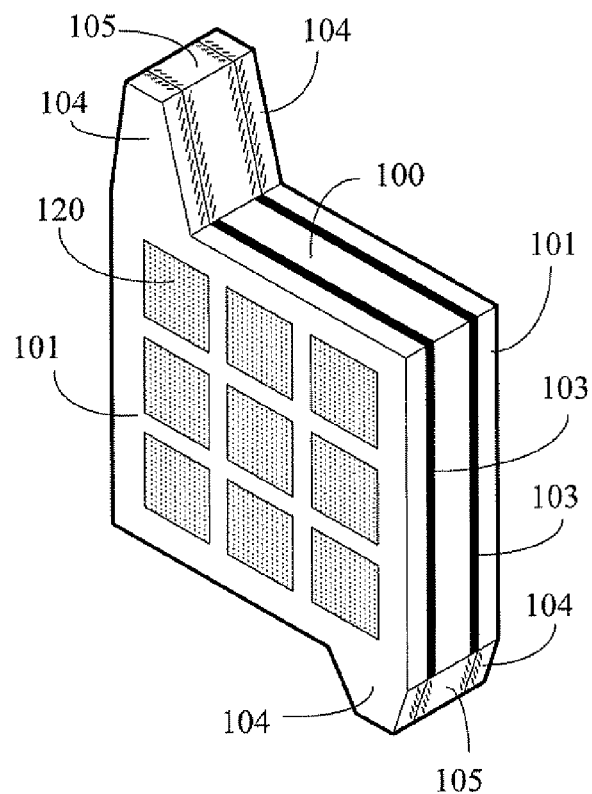
FIG. 4 is a schematic view showing three-dimensional structure of an electrode unit constituted by an auxiliary conductor, in which at least one current collecting terminal is installed at each of at least two sides thereof, and joined to two electrode plates with a same polarity, and in which at least one current collecting terminal is installed at each of at least two lateral sides of the auxiliary conductor, and an insulator is sandwiched therein according to the present invention.

FIG. 4 is a schematic view showing a three-dimensional structure of a electrode unit constituted by an auxiliary conductor, in which at least one current collecting terminal is installed at each of at least two sides thereof, and joined to two electrode plates with same polarity, in which at least one current collecting terminal is installed at each of at least two sides thereof and on two sides of the auxiliary conductor, with an insulator sandwiched therein, respectively, according to the present invention.

Figure 5:
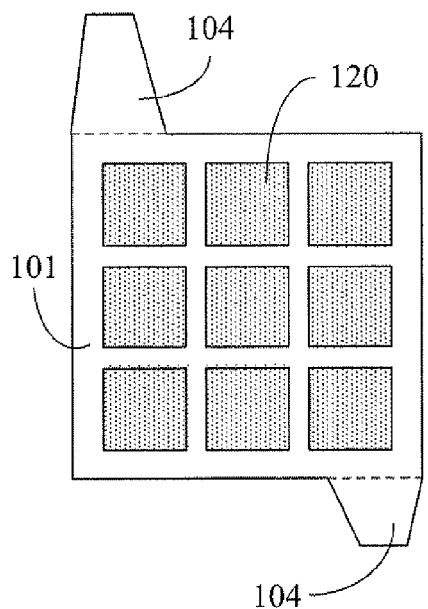
FIG. 5 is a front view of FIG. 4.

FIG. 5 is a front view of FIG. 4.

Figure 6:
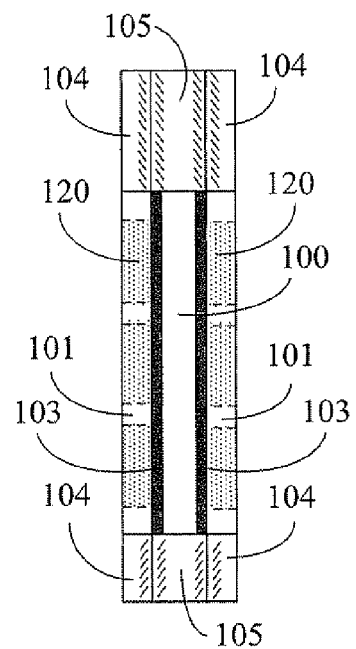
FIG. 6 is a side view of FIG. 4.

FIG. 6 is a side view of FIG. 4.

As shown in FIG. 4, FIG. 5, and FIG. 6, the mainly structural figure is installed with an auxiliary conductor 100, wherein one or more side electrode plates 101 are installed with at least one current collecting terminal 104 at two or more sides thereof, and coated with active substance 120 on the surface of the electrode plate, the electrode plates 101 being joined to the auxiliary conductor 100 which has a flat shape, strip, or mesh structure, and is made of the material and/or structure with a conductivity higher than that of the electrode plates. At least one input/output general current collecting terminal 105 is installed at each of two or more sides of the auxiliary conductor 100, for unilateral or multilateral parallel linking with the current collecting terminals installed at two or more sides of the side electrode plates, and which are used as general current collecting terminals to output current to an external part or to receive input current from the external part. An insulator 103 is installed between the auxiliary conductor 100 and the side electrode plate 101 to constitute an electrode unit and the number of the general current collecting terminals 105 for inputting/outputting the collection current is one or more.

The reserve power supply with electrode plates joined to auxiliary conductors may be applied to primary batteries, rechargeable batteries, capacitors, or super capacitors, or to a positive-negative electrode pair required for the fuel cell with electrode plate(s).

Figure 7:
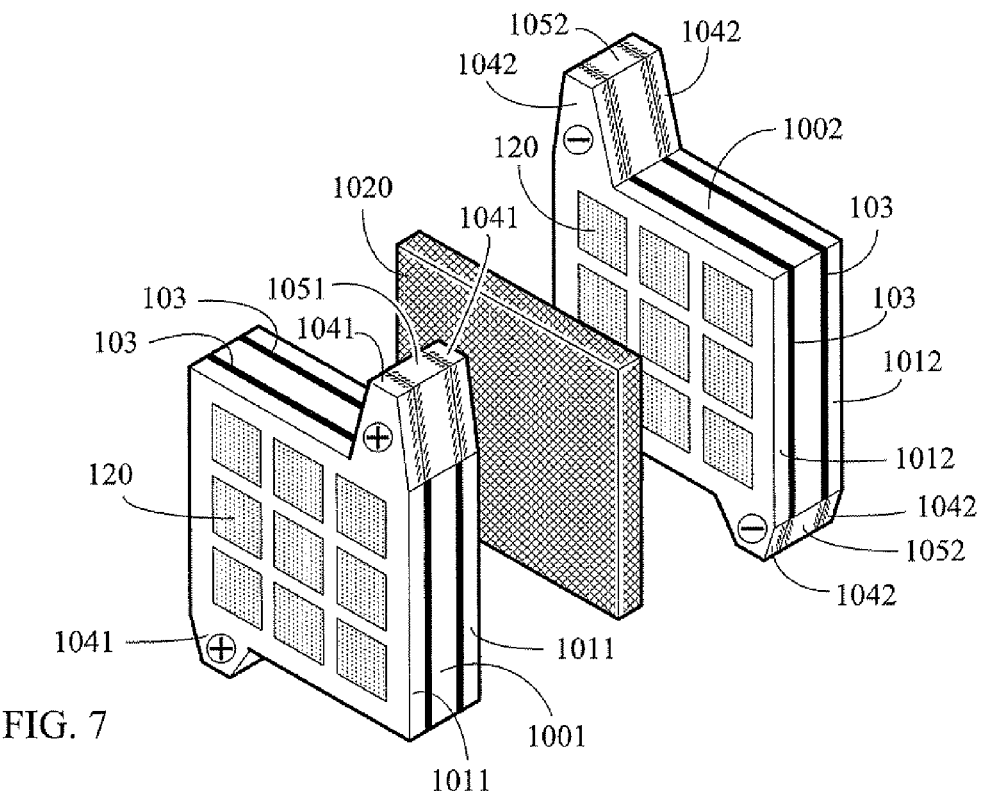
FIG. 7 is a schematic exploded view showing an embodiment, in which an electrode pair of a reserve power supply is constituted by a positive electrode unit composed of two anode electrode plates (1011) joined to an anode auxiliary conductor (1001), a negative electrode unit composed of two cathode electrode plates (1012) joined to a cathode auxiliary conductor (1002), and an isolating body sandwiched therein.

FIG. 7 is a schematic exploded view showing an embodiment, in which an electrode pair of a reserve power supply is constituted by two anode electrode plates (1011) joined to an anode auxiliary conductor (1001), two cathode electrode plates (1012) joined to a cathode auxiliary conductor (1002), and an isolating body sandwiched therein.

Figure 8:
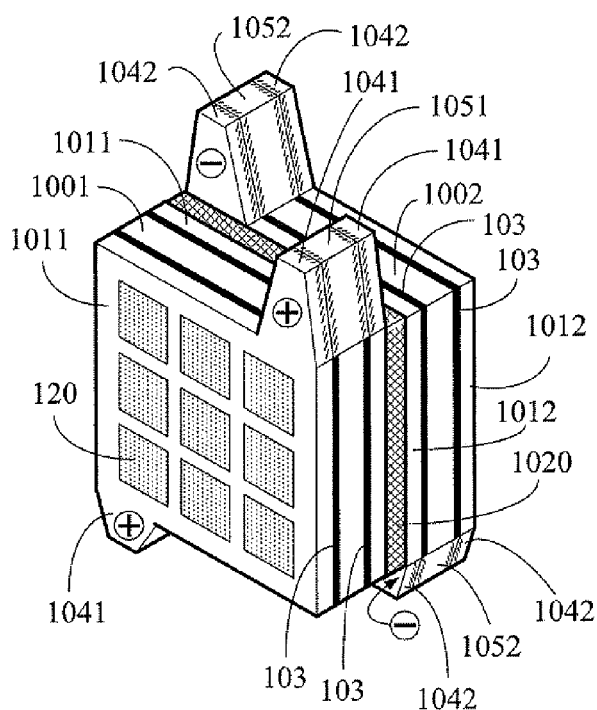
FIG. 8 is a schematic view showing an embodiment including a combination of the electrode pairs constituting the reserve power supply shown in FIG. 7.

FIG. 8 is a schematic view showing an embodiment that includes an electrode pair constituting the reserve power supply shown in FIG. 7.

Figure 9:
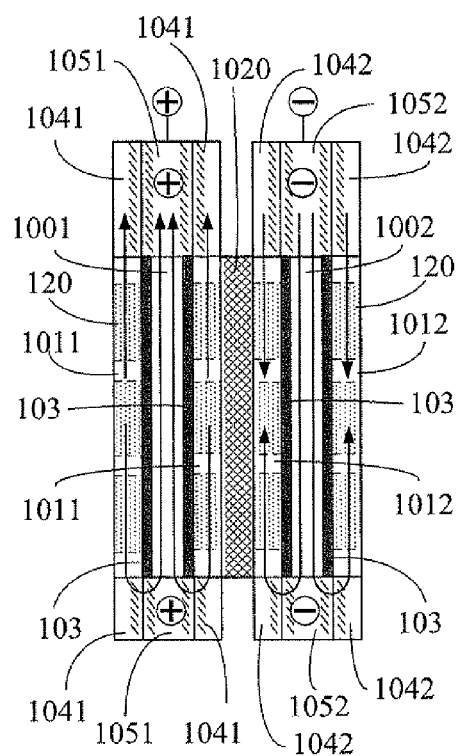
FIG. 9 is a schematic view showing the reserve power supply constituted by the electrode pairs shown in FIG. 8 and the current paths thereof.

FIG. 9 is a schematic view showing the reserve power supply constituted by the electrode pair shown in FIG. 8 and the current paths thereof.

As shown in FIG. 7, FIG. 8, and FIG. 9, an anode auxiliary conductor 1001 has one or more anode side electrode plates 1011, which are installed with at least one anode current collecting terminal 1041 at two or more sides thereof, and coated with an active substance 120 on the surface of the electrode plate, the electrode plates 1011 being joined to the anode auxiliary conductor 1001, which has a flat shape, strip, or mesh structure and is made of a material and/or structure with conductivity higher than that of the electrode plates. In this embodiment, at least one anode input/output general current collecting terminal 1051 is installed at each of two or more sides of the anode auxiliary conductor 1001, for unilateral or multilateral parallel linking with the anode current collecting terminals installed at two or more sides of the anode side electrode plates, and which are used as anode general current collecting terminals to output current to the external part or to receive input current from the external part An insulator 103 is installed between the anode auxiliary conductor 1001 and the anode side electrode plate 1011 to constitute a positive electrode unit; and the number of the anode input/output general current collecting terminal 1051 for inputting/outputting the collection current is one or more.

Also, one or more cathode side electrode plates 1012 are installed with at least one cathode current collecting terminal 1042 at two or more sides thereof, and coated with the active substance 120 on the surface of the electrode plate, the cathode electrode plates being joined to the cathode auxiliary conductor 1002, which has a flat shape, strip, or mesh structure, and is made of a material and/or structure having a conductivity higher than that of the electrode plates. At least one cathode input/output general current collecting terminal 1052 is installed at each of two or more sides of the cathode auxiliary conductor 1002, for unilateral or multilateral parallel linking with the cathode current collecting terminals installed at two or more sides of the cathode side electrode plates, and which are used as cathode general current collecting terminals to output current to the external part or to receive the input current from the external part. An insulator 103 is installed between the cathode auxiliary conductor 1002 and the cathode side electrode plate 1012 to constitute a negative electrode unit; and the number of the cathode input/output general current collecting terminal 1052 for inputting/outputting the collection current is one or more.

The positive electrode unit integrated with the negative electrode unit is installed in an electrode tank for constituting the electrode pair.

Figure 10:
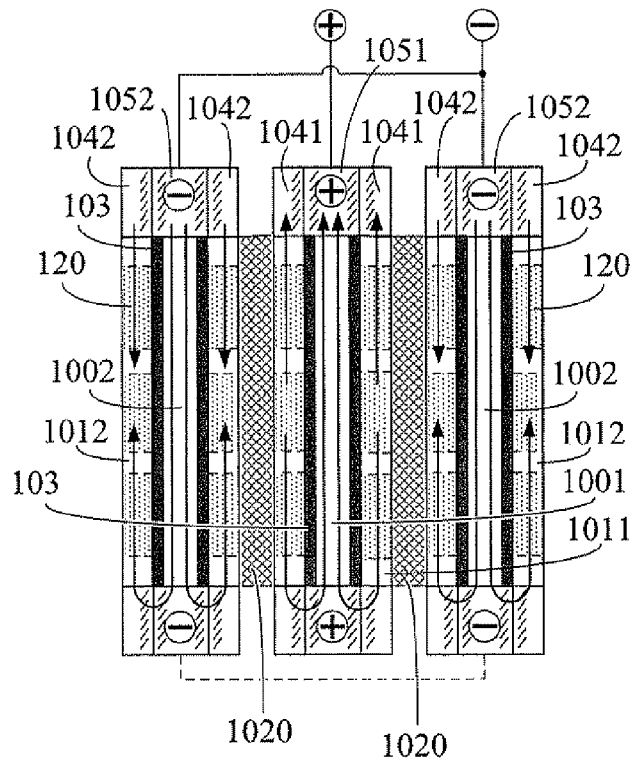
FIG. 10 is a schematic view showing an embodiment including a combination of two negative electrode units joined to a positive electrode unit at two sides thereof, according to the present invention.

FIG. 10 is a schematic view showing an embodiment including two negative electrode units joined to a positive electrode unit at two sides thereof, according to the present invention; in which:

the negative electrode unit is constituted by two cathode side electrode plates 1012 coated with the active substance 120 on the surface of each electrode plate, wherein the insulator 103 is installed between the intermediate section of the electrode plate and the cathode auxiliary conductor 1002, and joined to the cathode auxiliary conductor 1002 at two sides thereof; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit; and the positive electrode unit is constituted by two anode side electrode plates 1011 coated with the active substance 120 on the surface of each electrode plate, wherein the insulator 103 is installed between the intermediate section of the electrode plate and the anode auxiliary conductor 1001, and joined to the anode auxiliary conductor 1001 at two sides thereof; the anode current collecting terminal 1041 placed at two sides of each of two anode side electrode plates 1011 link with the anode input/output general current collecting terminals 1051 placed at two sides of the anode auxiliary conductor 1001 to constitute the positive electrode unit; the cathode input/output general current collecting terminals 1052 of the two negative electrode units are installed at two sides of the positive electrode unit for unilateral or multilateral parallel connection; and isolation bodies 1020 are installed between the two sides of the positive electrode unit and the two negative electrode units, respectively.

The positive electrode unit integrated with the negative electrode unit is installed in an electrode tank for constituting the electrode pair.

Figure 11:
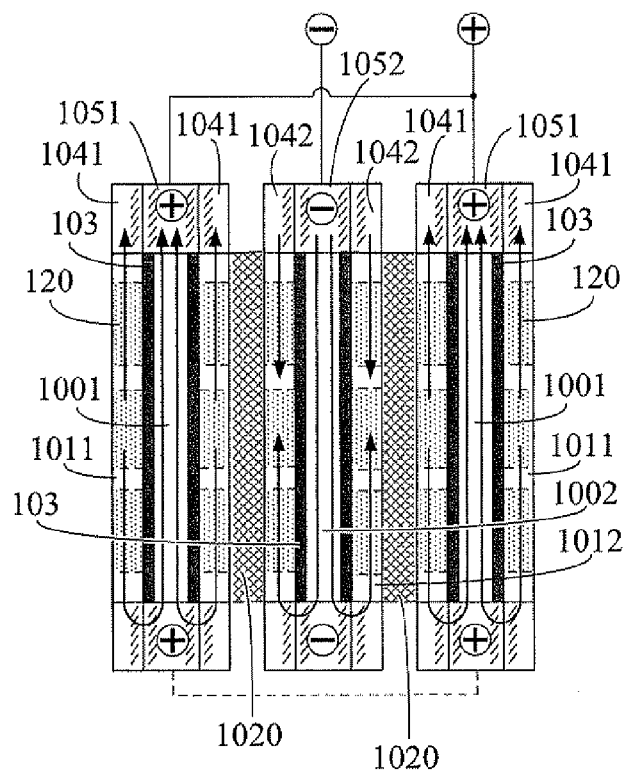
FIG. 11 is a schematic view showing an embodiment including a combination of two positive electrode units joined to a negative electrode unit at two sides thereof, according to the present invention.

FIG. 11 is a schematic view showing an embodiment of combination of two positive electrode units joined to a negative electrode unit at two sides thereof, according to the present invention; in which:

the negative electrode unit is constituted by two cathode side electrode plates 1012 coated with the active substance 120 on the surface of each electrode plate, wherein the insulator 103 is installed between the intermediate section of the electrode plate and the cathode auxiliary conductor 1002, and joined to the cathode auxiliary conductor 1002 at two sides thereof; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

the positive electrode unit is constituted by two anode side electrode plates 1011 coated with the active substance 120 on the surface of each electrode plate, wherein the insulator 103 is installed between the intermediate section of the electrode plate and the anode auxiliary conductor 1001, and joined to the anode auxiliary conductor 1001 at two sides thereof; the anode current collecting terminal 1041 placed at two sides of each of two anode side electrode plates 1011 link with the anode input/output general current collecting terminals 1051 placed at two sides of the anode auxiliary conductor 1001 to constitute the positive electrode unit; and the anode input/output general current collecting terminals 1051 of the two positive electrode units are installed at two sides of the negative electrode unit for unilateral or multilateral parallel connection; and isolation bodies 1020 are installed between the two sides of the negative electrode unit and the two positive electrode units, respectively.

The positive electrode unit integrated with the negative electrode unit is installed in an electrode tank for constituting the electrode pair.

Figure 12:
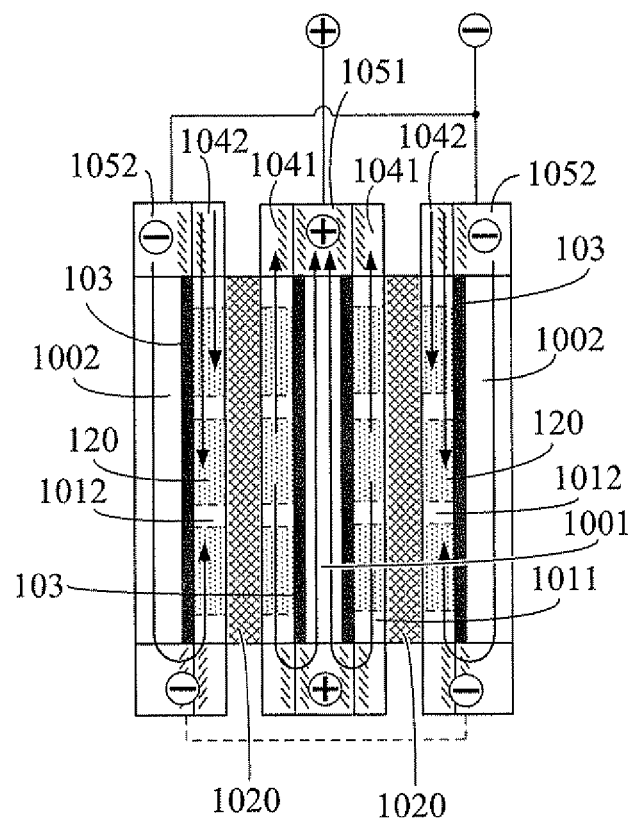
FIG. 12 is a schematic view showing a second embodiment including a combination of two negative electrode units joined to a positive electrode unit at two sides thereof, according to the present invention.

FIG. 12 is a schematic view showing the second embodiment of combination of two negative electrode units joined to a positive electrode unit at two sides thereof, according to the present invention; in which:

the negative electrode unit is constituted by the cathode side electrode plate 1012 coated with the active substance 120 on the surface of the electrode plate, wherein the insulator 103 is installed between the intermediate section of the electrode plate and the cathode auxiliary conductor 1002, and joined to the cathode auxiliary conductor 1002 at the lateral thereof; the cathode current collecting terminals 1042 placed at two sides of the cathode side electrode plate 1012 link with the cathode input/output general current collecting terminals 1052 placed at two sides of the cathode auxiliary conductor 1002 to constitute the negative electrode unit;

the positive electrode unit is constituted by two anode side electrode plates 1011 coated with the active substance 120 on the surface of each electrode plate, wherein the insulator 103 is installed between the intermediate section of the electrode plate and the anode auxiliary conductor 1001, and joined to the anode auxiliary conductor 1001 at two sides thereof; the anode current collecting terminal 1041 placed at two sides of each of two anode side electrode plates 1011 link with the anode input/output general current collecting terminals 1051 placed at two sides of the anode auxiliary conductor 1001 to constitute the positive electrode unit; and the cathode input/output general current collecting terminals 1052 of the two negative electrode units are installed at two sides of the positive electrode unit for unilateral or multilateral parallel connection; and isolating bodies 1020 are installed between the two sides of the positive electrode unit and the two negative electrode units, respectively, with the thus integrated positive and negative electrode units being installed in an electrode tank.

Figure 13:
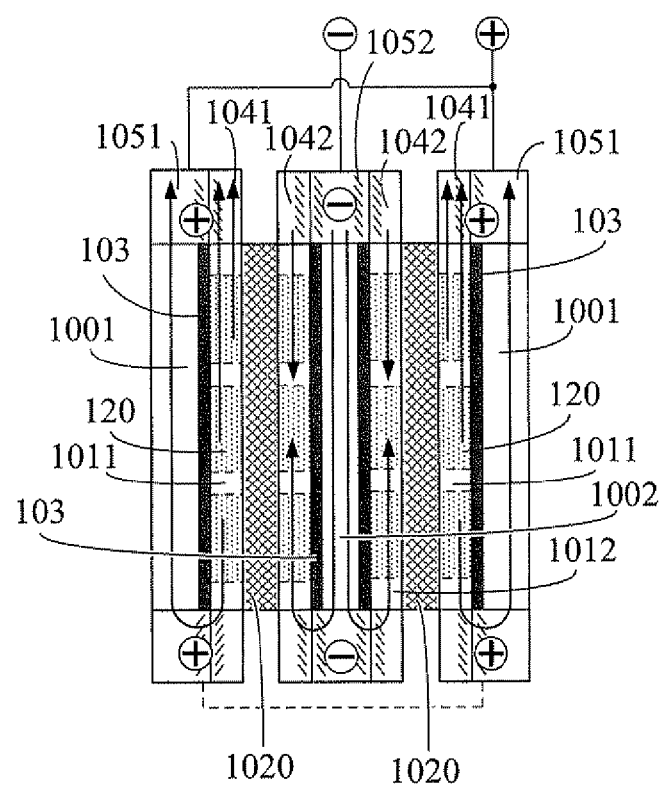
FIG. 13 is a schematic view showing the second embodiment including a combination of two positive electrode units joined to a negative electrode unit at two sides thereof, according to the present invention.

FIG. 13 is a schematic view showing a second embodiment including a combination of two positive electrode units joined to a negative electrode unit at two sides thereof, according to the present invention; in which the negative electrode unit is constituted by two cathode side electrode plates 1012 coated with an active substance 120 on the surface of each electrode plate, wherein the insulator 103 is installed between the intermediate section of the electrode plate and the cathode auxiliary conductor 1002, and joined to the cathode auxiliary conductor 1002 at two sides thereof; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

the positive electrode unit is constituted by the anode side electrode plate 1011 coated with the active substance 120 on the surface of the electrode plate, wherein the insulator 103 is installed between the intermediate section of the electrode plate and the anode auxiliary conductor 1001, and joined to the anode auxiliary conductor 1001 at the lateral thereof; the anode current collecting terminal 1041 placed at two sides of the anode side electrode plates 1011 link with the anode input/output general current collecting terminals 1051 placed at two sides of the anode auxiliary conductor 1001 to constitute the positive electrode unit; and the anode input/output general current collecting terminals 1051 of the two positive electrode units are installed at two sides of the negative electrode unit for unilateral or multilateral parallel connection; and isolating bodies 1020 are installed between the two sides of the negative electrode unit and the two positive electrode units, respectively.

The positive electrode unit integrated with the negative electrode unit is installed in an electrode tank for constituting the electrode pair.

Figure 14:
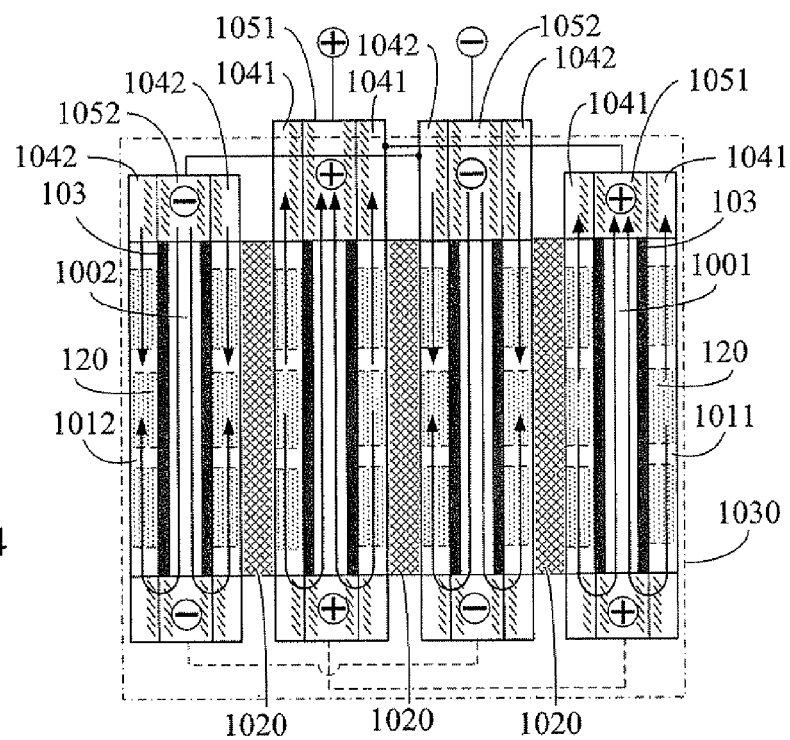
FIG. 14 is a schematic view showing an embodiment including a further combination of at least two negative electrode units and at least two positive electrode units placed in a staggered arrangement for unilaterally or bilaterally parallel connecting same polarity units in an electrode tank, in which an anode input/output general current collecting terminal 1051 of the positive electrode unit and a cathode input/output general current collecting terminal 1052 of the negative electrode unit, placed at an intermediate portion, are used as general current collecting terminals for inputting/outputting current, according to the present invention.

FIG. 14 is a schematic view showing an embodiment that includes at least two negative electrode units and at least two positive electrode units placed in a staggered arrangement for unilateral or bilateral parallel connecting same polarity units in an electrode tank, in which the anode input/output general current collecting terminal 1051 of the positive electrode unit and the cathode input/output general current collecting terminal 1052 of the negative electrode unit, placed at intermediate portion, are used as general current collecting terminals for inputting/outputting current, according to the present invention; in which the negative electrode unit is constituted by two cathode side electrode plates 1012 coated with the active substance 120 on the surface of each electrode plate, wherein the insulator 103 is installed between the intermediate section of the electrode plate and the cathode auxiliary conductor 1002, and joined to the cathode auxiliary conductor 1002 at two sides thereof; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

the positive electrode unit is constituted by two anode side electrode plates 1011 coated with the active substance 120 on the surface of each electrode plates, wherein the insulator 103 is installed between the intermediate section of the electrode plate and the anode auxiliary conductor 1001, and joined to the anode auxiliary conductor 1001 at two sides thereof; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit; and at least two negative electrode units and at least two positive electrode units are placed in staggered fashion in an electrode tank 1030, in which: the anode input/output general current collecting terminals 1051 of the positive electrode units are used for unilateral or bilateral parallel connecting same polarity anode units, the cathode input/output general current collecting terminals 1052 of the negative electrode units are used for unilateral or bilateral parallel connecting same polarity ones of the cathode units, and the anode input/output general current collecting terminal 1051 of the positive electrode unit and the cathode input/output general current collecting terminal 1052 of the negative electrode unit, placed at intermediate portion, are used as general current collecting terminals for the anodes and cathodes inputting/outputting current.

Figure 15:
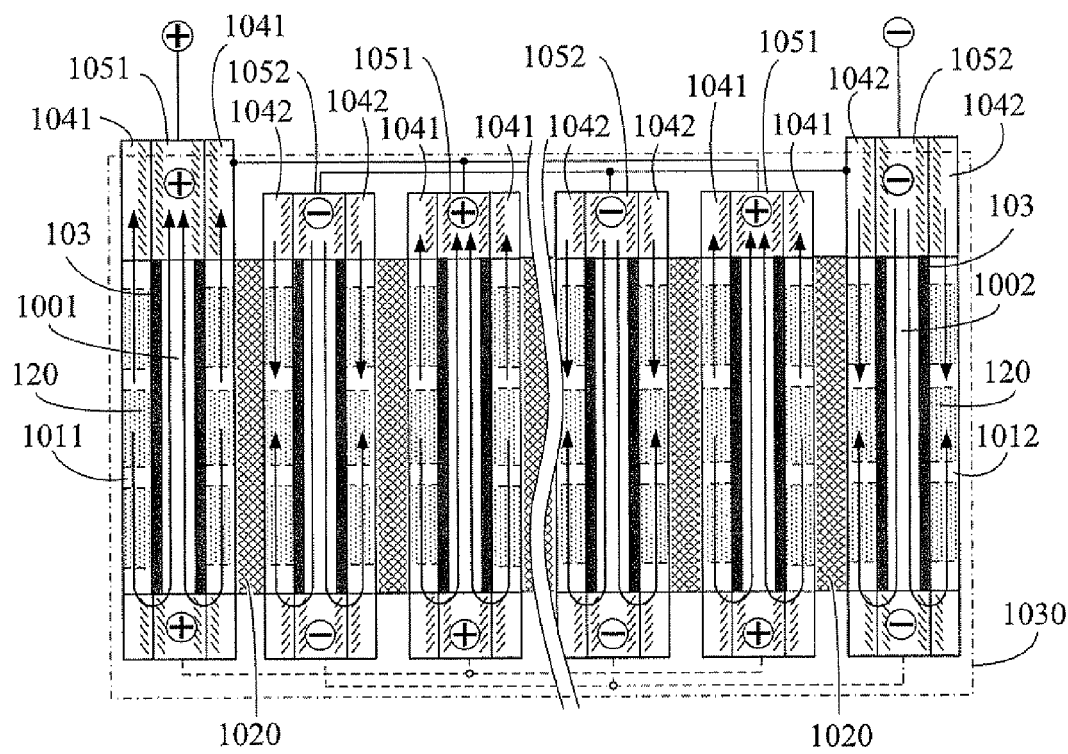
FIG. 15 is a schematic view showing a second embodiment including a combination of electrode units with same polarity for unilateral or bilateral parallel connection in an electrode tank, in which the anode input/output general current collecting terminal 1051 of the positive electrode unit and the cathode input/output general current collecting terminal 1052 of the negative electrode unit, placed at two sides, are used as general current collecting terminals for inputting/outputting current, according to the present invention.

FIG. 15 is a schematic view showing a second embodiment that includes a combination of electrode units with same polarity for unilateral or bilateral parallel connection in an electrode tank, in which the anode input/output general current collecting terminal 1051 of the positive electrode unit and the cathode input/output general current collecting terminal 1052 of the negative electrode unit, placed at two sides, are used as general current collecting terminals for inputting/outputting current, according to the present invention; in which: at least two negative electrode units and at least two positive electrode units are placed in a staggered arrangement;

the negative electrode unit is constituted by two cathode side electrode plates 1012 coated with the active substance 120 on the surface of each electrode plate, wherein the insulator 103 is installed between the intermediate section of the electrode plate and the cathode auxiliary conductor 1002, and joined to the cathode auxiliary conductor 1002 at two sides thereof; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

the positive electrode unit is constituted by two anode side electrode plates 1011 coated with the active substance 120 on the surface of each electrode plates, wherein the insulator 103 is installed between the intermediate section of the electrode plate and the anode auxiliary conductor 1001, and joined to the anode auxiliary conductor 1001 at two sides thereof; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit; and at least two negative electrode units and at least two positive electrode units are staggered placed in the electrode tank 1030, in which: the anode input/output general current collecting terminals 1051 of the positive electrode units are used for unilateral or bilateral parallel connecting same polarity positive electrode units, the cathode input/output general current collecting terminals 1052 of the negative electrode units are used for unilateral or bilateral parallel connecting the same polarity negative electrode units, and the anode input/output general current collecting terminal 1051 of the positive electrode unit and the cathode input/output general current collecting terminal 1052 of the negative electrode unit, placed at two sides, are used as general current collecting terminals for the anodes and cathodes inputting/outputting current.

Figure 16:
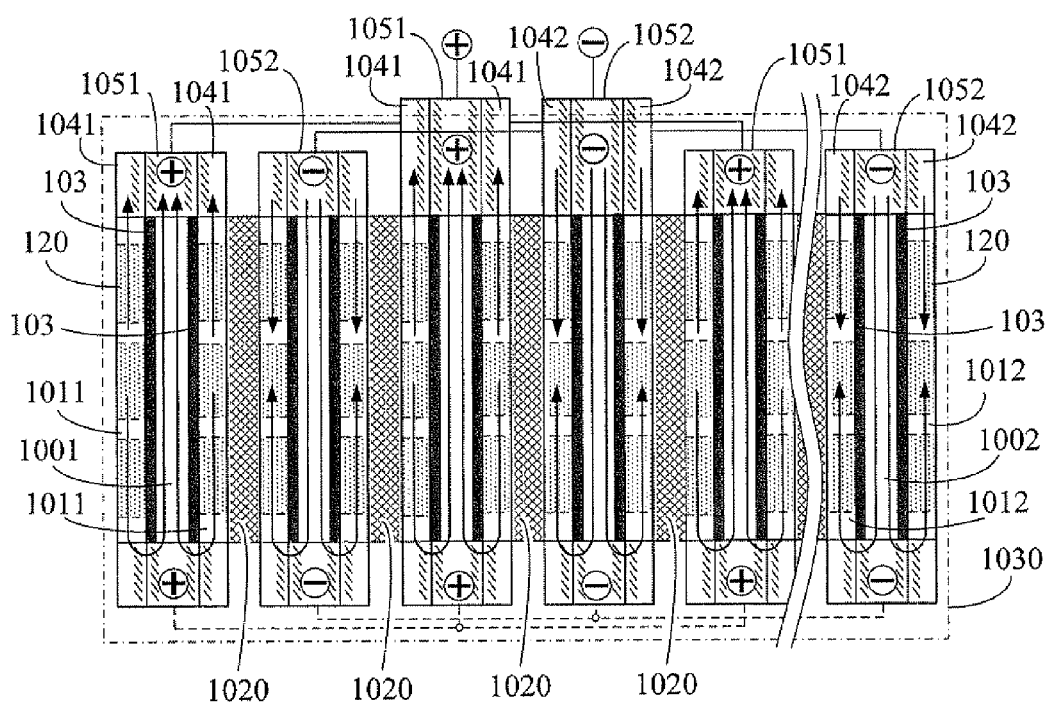
FIG. 16 is a schematic view showing a third embodiment including a combination of at least two negative electrode units and at least two positive electrode units placed in a staggered arrangement, in which the anode input/output general current collecting terminal 1051 of the positive electrode unit and the cathode input/output general current collecting terminal 1052 of the negative electrode unit, placed at intermediate portions, are used as general current collecting terminals for inputting/outputting current, according to the present invention.

FIG. 16 is a schematic view showing a third embodiment that includes a combination of at least two negative electrode units and at least two positive electrode units placed in a staggered arrangement, in which the anode input/output general current collecting terminal 1051 of the positive electrode unit and the cathode input/output general current collecting terminal 1052 of the negative electrode unit, placed at an intermediate portion, are used as general current collecting terminals for inputting/outputting current, according to the present invention; in which:

the negative electrode unit is constituted by two cathode side electrode plates 1012 coated with the active substance 120 on the surface of each electrode plate, wherein the insulator 103 is installed between the intermediate section of the electrode plate and the cathode auxiliary conductor 1002, and joined to the cathode auxiliary conductor 1002 at two sides thereof; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

the positive electrode unit is constituted by two anode side electrode plates 1011 coated with the active substance 120 on the surface of each electrode plates, wherein the insulator 103 is installed between the intermediate section of the electrode plate and the anode auxiliary conductor 1001, and joined to the anode auxiliary conductor 1001 at two sides thereof; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit; and at least two negative electrode units and at least two positive electrode units are placed in staggered fashion in the electrode tank 1030, in which: the anode input/output general current collecting terminals 1051 of the positive electrode units are used for unilateral or bilateral parallel connecting the corresponding same polarity units, the cathode input/output general current collecting terminals 1052 of the negative electrode units are used for unilateral or bilateral parallel connecting the corresponding same polarity units, and the anode input/output general current collecting terminal 1051 of the positive electrode unit and the cathode input/output general current collecting terminal 1052 of the negative electrode unit, placed at an intermediate portion, are used as general current collecting terminals for the anodes and cathodes inputting/outputting current.

Figure 17:
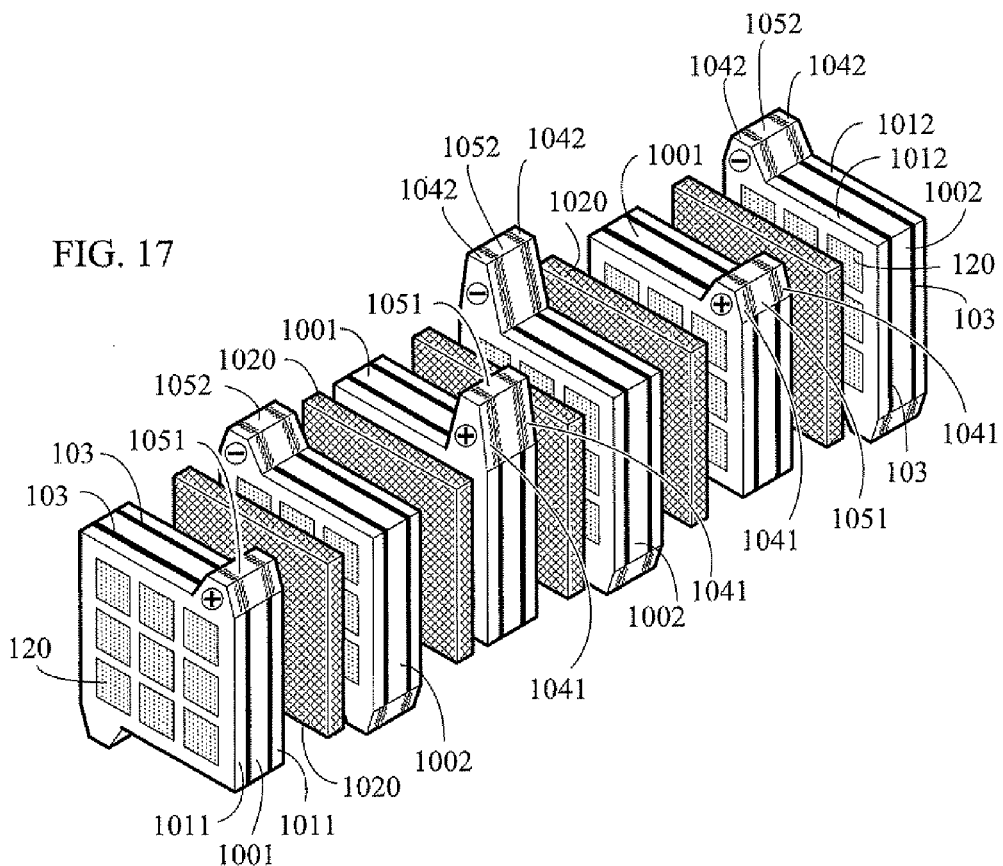
FIG. 17 is a three-dimensional schematic view showing the exploded structure of FIG. 16.

FIG. 17 is a three-dimensional schematic view showing the exploded structure of FIG. 16.

Figure 18:
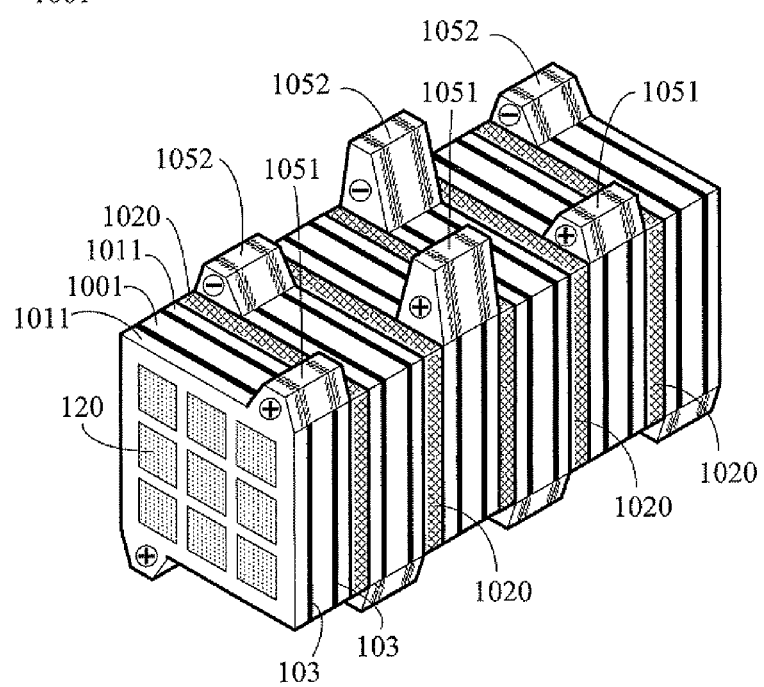
FIG. 18 is a three-dimensional schematic view showing the composition of FIG. 16.

FIG. 18 is a three-dimensional schematic view showing the composition of FIG. 16.

Figure 19:
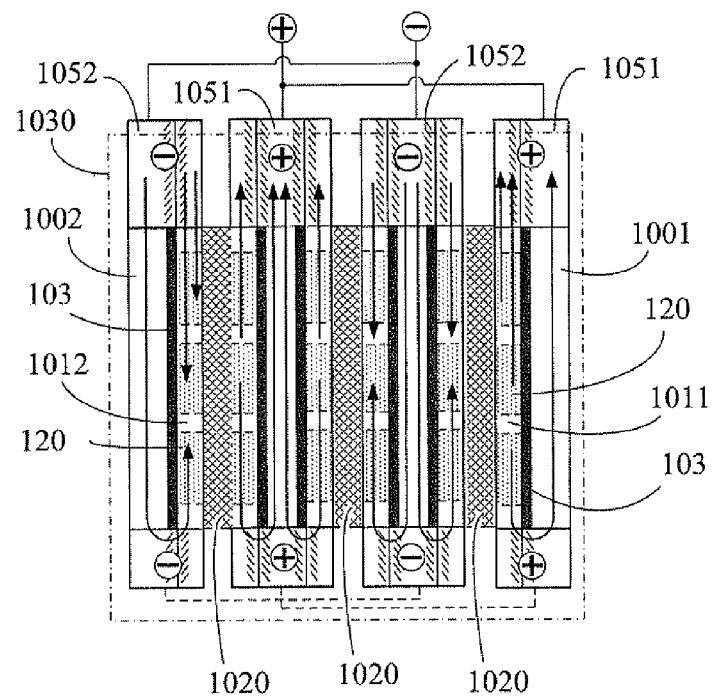
FIG. 19 is a schematic view showing an embodiment including a combination of electrode pairs constituted by positive and negative electrodes for staggered parallel superposition, in which the positive-negative electrode pairs are joined according to the present invention.

Another structural mode of the present invention is shown as FIG. 19, which is a schematic view showing an embodiment that includes a combination of electrode pairs constituted by positive and negative electrodes for staggered parallel superposition, in which the positive-negative electrode pair with input/output general current collecting terminals is joined therein, according to the present invention; in which, the positive electrode unit on one side is constituted by the auxiliary conductor 1001 joined to the anode side electrode plate 1011 coated with the active substance 120 on the surface of the electrode plate, wherein the insulator 103 is installed between the intermediate section of the auxiliary conductor and the anode side electrode plate 1011; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit;

the negative electrode unit placed at another side is constituted by the cathode auxiliary conductor 1002 joined to the cathode side electrode plate 1012 coated with the active substance 120 on the surface of the electrode plate, wherein the insulator 103 is installed between the intermediate section of the auxiliary conductor and the cathode side electrode plate 1012; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

two cathode side electrode plates 1012 are coated with the active substance 120 on each electrode plate, wherein the insulator 103 is installed between the intermediate section of the electrode plate and the cathode auxiliary conductor 1002, and joined to the cathode auxiliary conductor 1002 at two sides thereof, and the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

two anode side electrode plates 1011 are coated with the active substance 120 on each electrode plate, wherein the insulator 103 is installed between the intermediate section of the electrode plate and the anode auxiliary conductor 1001, and joined to the anode auxiliary conductor 1001 at two sides thereof, and the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit; and the above negative electrode units and positive electrode units are placed in staggered arrangement to form electrode pairs in which a negative electrode unit and a positive electrode unit, placed at two sides, are placed in the electrode tank 1030, and the isolating body 1020 is installed between the positive and negative electrode units in a staggered placement, in which: the anode input/output general current collecting terminal 1051 of each positive electrode unit is unilateral or multilateral connected with same polarity, the cathode input/output general current collecting terminal 1052 of each negative electrode unit is unilateral or multilateral connected with a same polarity, and the anode input/output general current collecting terminal 1051 of the positive electrode unit and the cathode input/output general current collecting terminal 1052 of the negative electrode unit, placed at an intermediate portion, are used as general current collecting terminals for inputting/outputting current.

Figure 20:
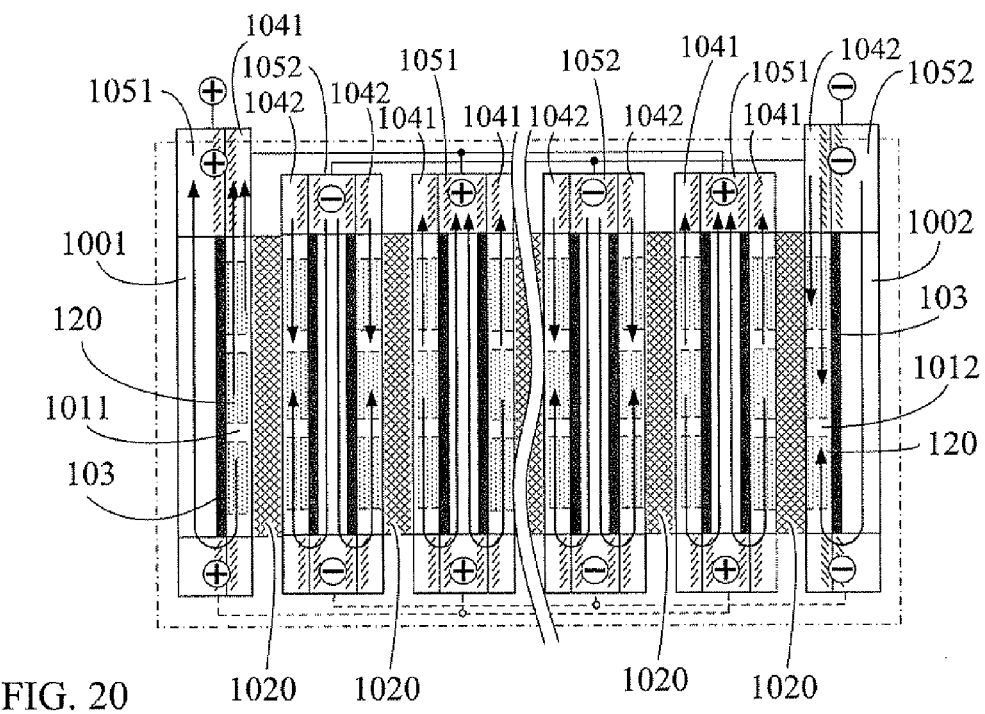
FIG. 20 is a schematic view showing a second embodiment that includes a combination of negative electrode units and positive electrode units for staggered placement, in which the anode input/output general current collecting terminal 1051 of the positive electrode unit and the cathode input/output general current collecting terminal 1052 of the negative electrode unit, placed at two sides, are used as general current collecting terminals for inputting/outputting current.

Another structural mode of the present invention is shown as FIG. 20, which is a schematic view showing a second embodiment including a combination of negative electrode units and positive electrode units for staggered placement, in which the anode input/output general current collecting terminal 1051 of the positive electrode unit and the cathode input/output general current collecting terminal 1052 of the negative electrode unit, placed at two sides, are used as general current collecting terminals for inputting/outputting current; in which, the positive electrode unit placed at one side is constituted by the auxiliary conductor 1001, which is joined to the anode side electrode plate 1011 coated with the active substance 120 on the surface of the electrode plate, wherein the insulator 103 is installed between the intermediate section of the auxiliary conductor and the anode side electrode plate 1011; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit;

the negative electrode unit placed at another lateral is constituted by the cathode auxiliary conductor 1002 placed at lateral joined to the cathode side electrode plate 1012 coated with the active substance 120 on the surface of the electrode plate, wherein the insulator 103 is installed between the intermediate section of the auxiliary conductor and the cathode side electrode plate 1012; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

two cathode side electrode plates 1012 are coated with the active substance 120 on each electrode plate, wherein the insulator 103 is installed between the intermediate section of the electrode plate and the cathode auxiliary conductor 1002, and clip with the cathode auxiliary conductor 1002 at two sides thereof, and the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

two anode side electrode plates 1011 are coated with the active substance 120 on each electrode plate, wherein the insulator 103 is installed between the intermediate section of the electrode plate and the anode auxiliary conductor 1001, and joined to the anode auxiliary conductor 1001 at two sides thereof, and the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit; and the above negative electrode units and positive electrode units are placed in a staggered arrangement for constituting the electrode pairs, the negative electrode unit and the positive electrode unit, placed at two sides, being placed in the electrode tank 1030, and the isolating body 1020 being installed between the positive and negative electrode units, which are also in staggered placement, in which: the anode input/output general current collecting terminals 1051 placed at two sides of each positive electrode unit coated with the active substance 120 on the electrode plate are unilateral or multilateral connected with same polarity, the cathode input/output general current collecting terminals 1052 placed at two sides of each negative electrode unit are unilateral or multilateral connected with same polarity, and the anode input/output general current collecting terminal 1051 of the positive electrode unit and the cathode input/output general current collecting terminal 1052 of the negative electrode unit, placed at two sides, are used as general current collecting terminals for the anodes and cathodes inputting/outputting current.

Figure 21:
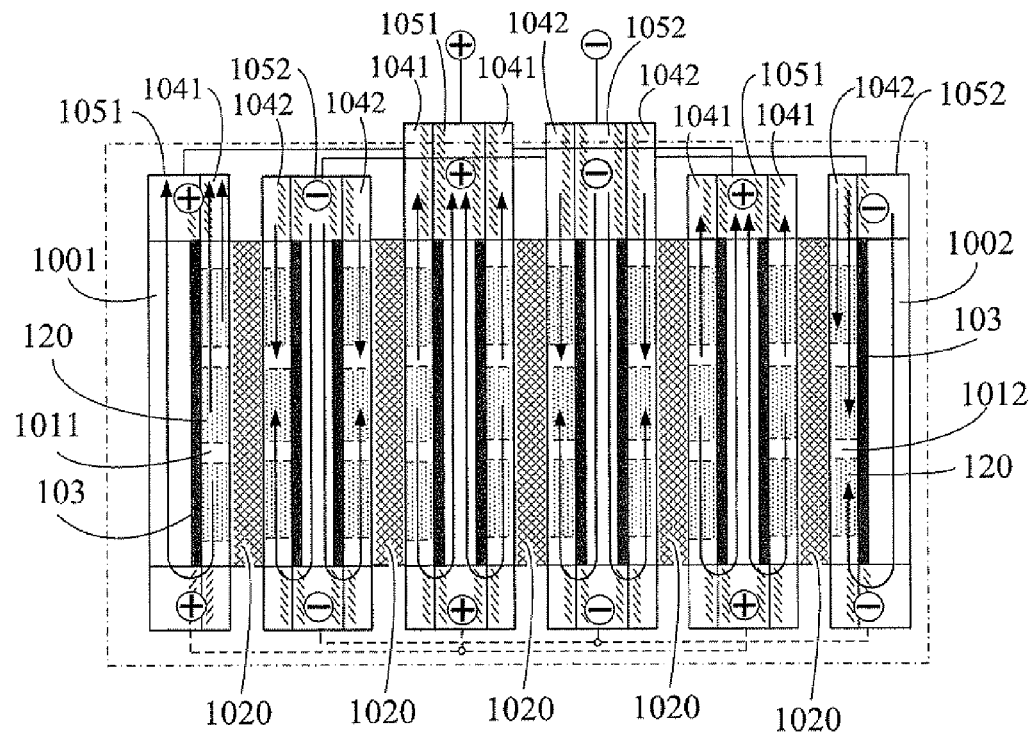
FIG. 21 is a schematic view showing a third embodiment including a combination of negative electrode units and positive electrode units for staggered placement, in which the anode input/output general current collecting terminal 1051 of the positive electrode unit and the cathode input/output general current collecting terminal 1052 of the negative electrode unit, placed at an intermediate portion, are used as general current collecting terminals for inputting/outputting current.

Another structural mode of the present invention is shown as FIG. 21, which is a schematic view showing a third embodiment that includes a combination of negative electrode units and positive electrode units for staggered placement, in which the anode input/output general current collecting terminal 1051 of the positive electrode unit and the cathode input/output general current collecting terminal 1052 of the negative electrode unit, placed at an intermediate portion, are used as general current collecting terminals for inputting/outputting current; in which, the positive electrode unit placed at one side is constituted by the auxiliary conductor 1001 joined to the anode side electrode plate 1011 coated with the active substance 120 on the surface of the electrode plate, wherein the insulator 103 is installed between the intermediate section of the auxiliary conductor and the anode side electrode plate 1011; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit;

the negative electrode unit placed at another side is constituted by the cathode auxiliary conductor 1002 joined to the cathode side electrode plate 1012 coated with the active substance 120 on the surface of the electrode plate, wherein the insulator 103 is installed between the intermediate section of the auxiliary conductor and the cathode side electrode plate 1012; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

two cathode side electrode plates 1012 are coated with the active substance 120 on each electrode plate, wherein the insulator 103 is installed between the intermediate section of the electrode plate and the cathode auxiliary conductor 1002, and clip with the cathode auxiliary conductor 1002 at two sides thereof, and the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

two anode side electrode plates 1011 are coated with the active substance 120 on each electrode plate, wherein the insulator 103 is installed between the intermediate section of the electrode plate and the anode auxiliary conductor 1001, and joined to the anode auxiliary conductor 1001 at two sides thereof, and the anode current collecting terminals 1041 placed at two sides of each of two anode side electrode plate1 1011 link with the anode input/output general current collecting terminals 1051 placed at two sides of the anode auxiliary conductor 1001 to constitute the positive electrode unit; and the above negative electrode units and positive electrode units are in a staggered placement for constituting the electrode pairs, the negative electrode unit and the positive electrode unit, placed at two sides, are placed in the electrode tank 1030, and the isolating body 1020 is installed between the positive and negative electrode units, which are also in staggered placement, in which: the anode input/output general current collecting terminal 1051 of each positive electrode unit coated with the active substance 120 on the electrode plate is unilateral or multilateral connected with same polarity, the cathode input/output general current collecting terminal 1052 of each negative electrode unit is unilateral or multilateral connected with same polarity, and the anode input/output general current collecting terminal 1051 of the positive electrode unit and the cathode input/output general current collecting terminal 1052 of the negative electrode unit, placed at intermediate portion, are used as general current collecting terminals for the anodes and cathodes inputting/outputting current.

Figure 22:
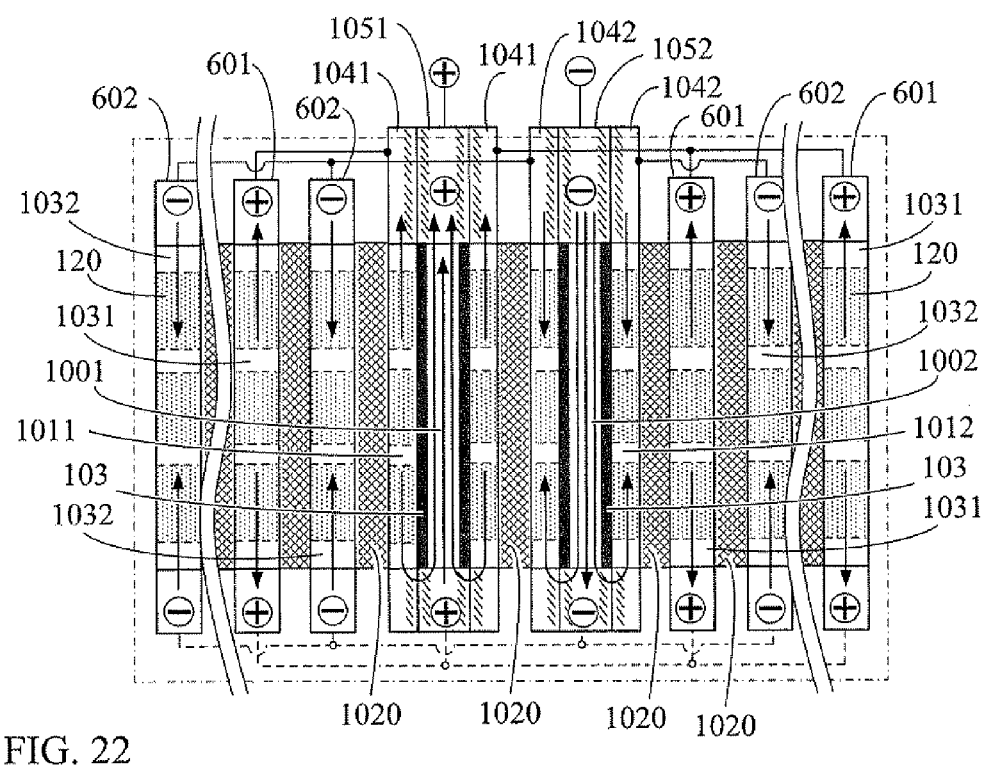
FIG. 22 is a schematic view showing a combination of electrode pairs constituted by at least one positive electrode unit and at least one negative electrode unit, and in which a monolithic positive polarity electrode plate, and a monolithic negative polarity electrode plate, are in staggered superposition, and the anode input/output general current collecting terminal 1051 of the positive electrode unit and the cathode input/output general current collecting terminal 1052 of the negative electrode unit, placed at intermediate portion, are used as general current collecting terminals for inputting/outputting current.

The present invention is further shown as FIG. 22, which is a schematic view showing a combination constituted by at least one positive electrode unit and at least one negative electrode unit, in which a monolithic positive polarity electrode plate and a monolithic negative polarity electrode plate are in staggered superposition, and the anode input/output general current collecting terminal 1051 of the positive electrode unit and the cathode input/output general current collecting terminal 1052 of the negative electrode unit, placed at an intermediate portion, are used as general current collecting terminals for inputting/outputting current; in which:

at least one negative electrode unit is constituted by two cathode side electrode plates 1012 coated with the active substance 120 on the surface of each electrode plate, wherein the insulator 103 is installed between the intermediate section of the electrode plate and the cathode auxiliary conductor 1002, and joined to the cathode auxiliary conductor 1002 at two sides thereof; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

at least one positive electrode unit is constituted by two anode side electrode plates 1011 coated with the active substance 120 on the surface of each electrode plates, wherein the insulator 103 is installed between the intermediate section of the electrode plate and the anode auxiliary conductor 1001, and joined to the anode auxiliary conductor 1001 at two sides thereof; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit; and the negative electrode unit and the positive electrode unit are respectively staggered with one or more monolithic electrode plate units and placed in the electrode tank 1030, in which, the monolithic anode electrode plate 1031 and the monolithic cathode electrode plate 1032 are coated with the active substance 120 on the electrode plates, and are placed in a staggered arrangement at two sides of the positive electrode unit and the negative electrode unit by polarity; the isolating bodies 1020 are installed between the positive electrode unit, the negative electrode unit, the monolithic anode electrode plate 1031, and the monolithic cathode electrode plate 1032, respectively; the anode input/output general current collecting terminals 1051 of the positive electrode units, and the current collecting terminals 601 of the monolithic anode electrode plate 1031 are used for unilateral or multilateral parallel connecting same polarity ones of the corresponding plates; the cathode input/output general current collecting terminals 1052 of the negative electrode units, and the current collecting terminal 602 of the monolithic cathode electrode plate 1032 are used for unilateral or multilateral parallel connecting same polarity ones of the corresponding plates; and the anode input/output general current collecting terminal 1051 of the positive electrode unit and the cathode input/output general current collecting terminal 1052 of the negative electrode unit, placed at intermediate portion, are used as general current collecting terminals for the anodes and cathodes inputting/outputting current.

Figure 23:
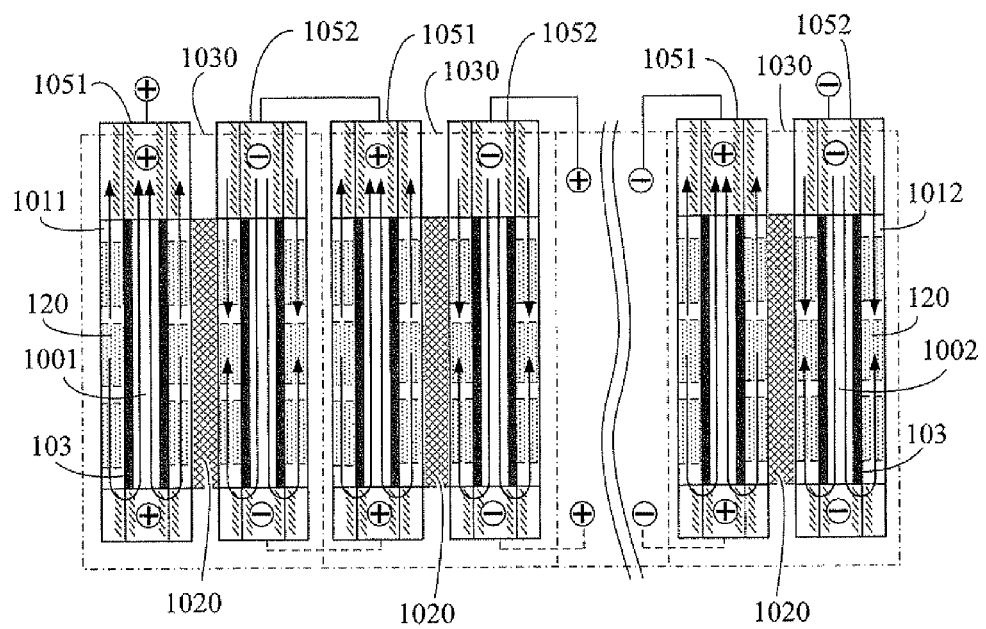
FIG. 23 is a schematic view showing an embodiment in which a number of electrode pairs constituted by positive-negative electrode units are placed in individual electrode tanks or cells 1030 and unilaterally or multilaterally connected in series by different polarities.

The present invention is further shown as FIG. 23, which is a schematic view showing an embodiment of combination, in which a number of electrode pairs constituted by positive-negative electrode units placed in individual electrode tanks or cells 1030 are unilateral or multilateral connected in series by different polarities; in which:

at least two negative electrode units are constituted by two cathode side electrode plates 1012 coated with the active substance 120 on the surface of each electrode plate, wherein the insulator 103 is installed between the intermediate section of the electrode plate and the cathode auxiliary conductor 1002, and joined to the cathode auxiliary conductor 1002; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

at least two positive electrode units are constituted by two anode side electrode plates 1011 coated with the active substance 120 on the surface of each electrode plates, wherein the insulator 103 is installed between the intermediate section of the electrode plate and the anode auxiliary conductor 1001, and joined to the anode auxiliary conductor 1001; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit; and at least one or more negative electrode units and at least one or more positive electrode units are staggered placed for constituting the electrode pairs, and the isolating bodies 1020 are installed between each electrode unit for being placed in the same electrode tank or cell 1030; wherein if there are more than one electrode units with same polarity placed in the same electrode tank or 1030, the current collecting terminals of the electrode units with same polarity are mutually unilateral or multilateral parallel connected; and in which, the anode input/output general current collecting terminal 1051 of the positive electrode unit and the cathode input/output general current collecting terminal 1052 of the negative electrode unit, which constitute the electrode pair in each electrode tank or cell 1030, are exposed to the outside of the tank shell of the electrode tank or cell 1030, for unilateral or multilateral connection in series with the electrode pair in a different electrode tank 1030 by different polarity; and wherein in different electrode tanks or cells 1030, the anode input/output general current collecting terminal 1051 of the positive electrode unit and the cathode input/output general current collecting terminal 1052 of the negative electrode unit in the electrode pair after being connected in series are used as anode and cathode general current collecting terminals for inputting/outputting current after the connected in series.

Figure 24:
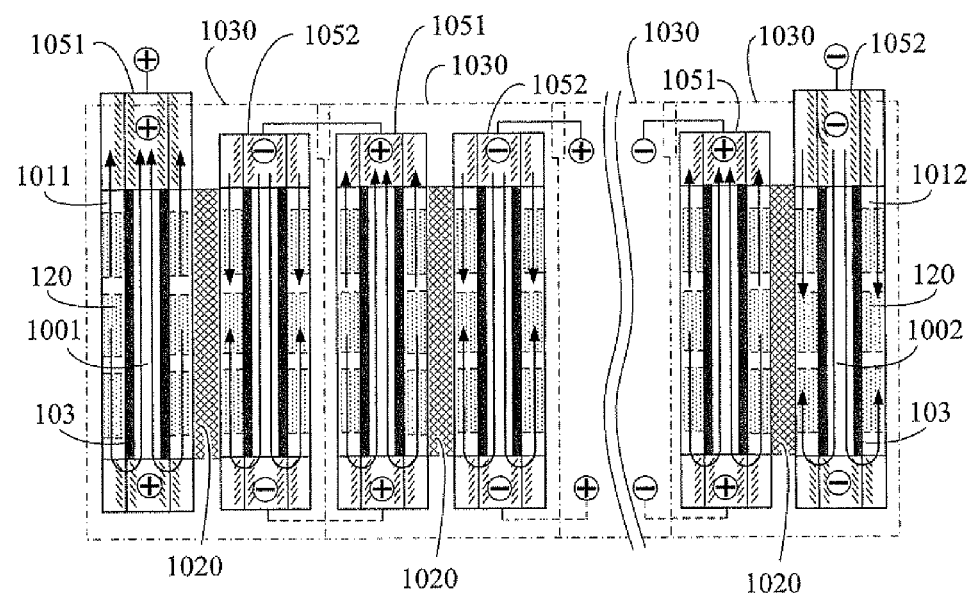
FIG. 24 is a schematic view showing a second embodiment of the combination shown in FIG. 23, in which the anode input/output general current collecting terminal and the cathode input/output general current collecting terminal, which are used to input/output current, are exposed to the outside of the tank shell of the electrode tank 1030, and in which the other current collecting terminals are hidden within the electrode tank 1030.

FIG. 24 is a schematic view showing the second embodiment of combination shown in FIG. 23, in which except for the anode input/output general current collecting terminal and the cathode input/output general current collecting terminal, which are used to input/output current, are exposed to the outside of the tank shell of the electrode tank 1030, the other current collecting terminals are hidden within the electrode tank 1030.

As shown in FIG. 24, in which the anode input/output general current collecting terminal and the cathode input/output general current collecting terminal used to input/output current are exposed to the outside of the tank shell of the electrode tank 1030, and the other current collecting terminals are hidden within the electrode tank 1030, and the other compositions are same as that of FIG. 23.

Figure 25:
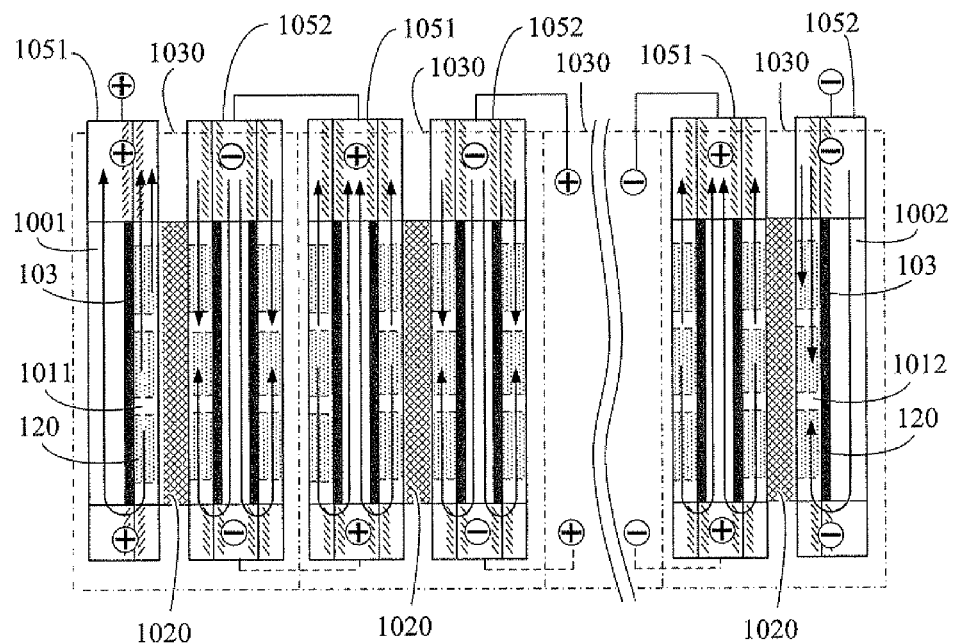
FIG. 25 is a schematic view showing an embodiment in which a number of electrode pairs constituted by positive-negative electrode units are placed in individual electrode tanks or cells 1030 and unilateral or multilateral connected in series by different polarities.

FIG. 25 is a schematic view showing an embodiment that includes a combination, in which a number of electrode pairs constituted by positive-negative electrode units placed at individual electrode tank 1030 are unilateral or multilateral connected in series by different polarity.

As shown in FIG. 25, the positive electrode unit in the electrode tank 1030 for inputting/outing the anode current after being connected in series is constituted by the anode auxiliary conductor 1001 placed at one side, in which the insulator 103 is installed between the intermediate section of the auxiliary conductor and the anode side electrode plate 1011, and joined to the anode side electrode plate 1011; the anode current collecting terminals 1041 placed at two sides of the anode side electrode plate 1011 link with the anode input/output general current collecting terminals 1051 placed at two sides of the anode auxiliary conductor 1001 to constitute the positive electrode unit;

two cathode side electrode plates 1012 coated with the active substance 120 on the surface of each electrode plate, in which the insulator 103 is installed between the intermediate section of the electrode plate and the cathode auxiliary conductor 1002, and joined to the cathode auxiliary conductor 1002 at two sides thereof; the cathode current collecting terminals 1042 placed at two sides of each of two cathode side electrode plates 1012 link with the cathode input/output general current collecting terminals 1052 placed at two sides of the cathode auxiliary conductor 1002 to constitute the negative electrode unit;

if there are more than one electrode units with same polarity placed in the electrode tank 1030, the current collecting terminals of the electrode units with same polarity are mutually unilateral or multilateral parallel connected;

also, the negative electrode unit in another electrode tank 1030 for inputting/outing the cathode current after connected in series is constituted by the cathode auxiliary conductor 1002 placed at the lateral, in which the insulator 103 is installed between the intermediate section of the auxiliary conductor and the cathode side electrode plate 1012, and joined to the cathode side electrode plate 1012 coated with the active substance 120 on the surface of the electrode plate; the cathode current collecting terminal 1042 placed at two sides of the cathode side electrode plate 1012 link with the cathode input/output general current collecting terminals 1052 placed at two sides of the cathode auxiliary conductor 1002 to constitute the negative electrode unit placed at lateral;

two anode side electrode plates 1011 coated with the active substance 120 on the surface of each electrode plate, in which the insulator 103 is installed between the intermediate section of the electrode plate and the anode auxiliary conductor 1001, and joined to the anode auxiliary conductor 1001 at two sides thereof; the anode current collecting terminals 1041 placed at two sides of each of two anode side electrode plates 1011 link with the anode input/output general current collecting terminals 1051 placed at two sides of the anode auxiliary conductor 1001 to constitute the positive electrode unit;

if there are more than one electrode units with same polarity placed in the electrode tank 1030, the current collecting terminals of the electrode units with same polarity are mutually unilateral or multilateral parallel connected;

at least one or more negative electrode units and at least one or more positive electrode units are staggered placed for constituting the electrode pairs placed in the individual electrode tank 1030 connected in series, and the isolating bodies 1020 are installed between each electrode unit for being placed in the same electrode tank 1030; if there are more than one electrode units with same polarity placed in the same electrode tank 1030, the current collecting terminals of the electrode units with same polarity are mutually unilateral or multilateral parallel connected; in which:

the anode input/output general current collecting terminal 1051 of the positive electrode unit and the cathode input/output general current collecting terminal 1052 of the negative electrode unit, which constitute the electrode pair in each electrode tank 1030 connected in series, are unilateral or multilateral connected in series with the electrode pair in different electrode tank 1030 by different polarity; in different electrode tanks, the anode input/output general current collecting terminal 1051 of the positive electrode unit and the cathode input/output general current collecting terminal 1052 of the negative electrode unit in the electrode pair 1030 after being connected in series are used as anode and cathode general current collecting terminals for inputting/outputting current after being connected in series.

Figure 26:
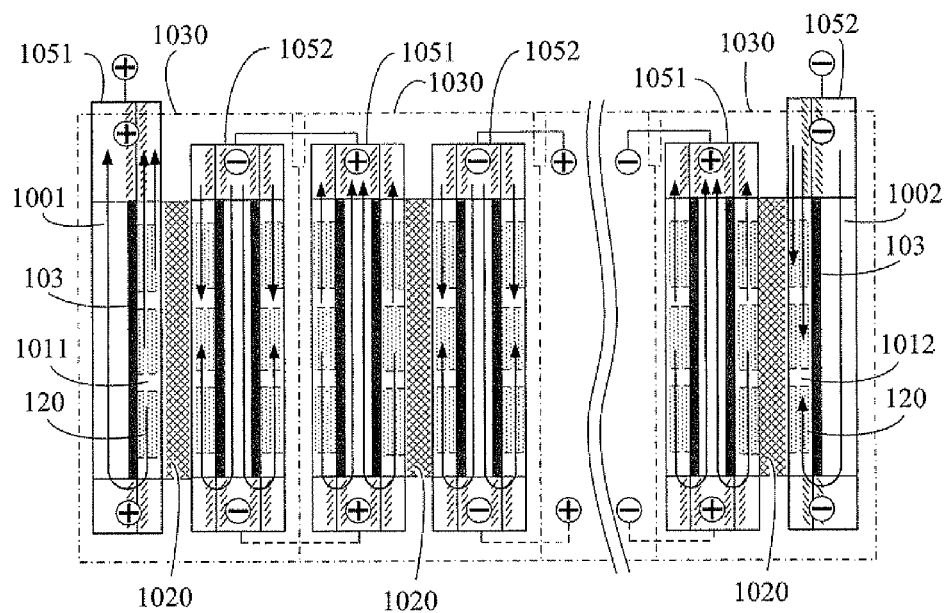
FIG. 26 is a schematic view showing a second embodiment of the combination shown in FIG. 25, in which current terminals used to input/output current are exposed to the outside of the tank shell, and the other current collecting terminals are hidden within the electrode tank 1030.

FIG. 26 is a schematic view showing a second embodiment of the combination shown in FIG. 25, in which the current terminals used to input/output current are exposed to the outside of the tank shell, and the other current collecting terminals are hidden within the electrode tank 1030.

As shown in FIG. 26, the anode input/output general current collecting terminal and the cathode input/output general current collecting terminal for inputting/outputting current are exposed to the outside of the tank shell, and the other current collecting terminals are hidden within the electrode tank 1030, the other compositions being the same as that of FIG. 25.

Figure 27:
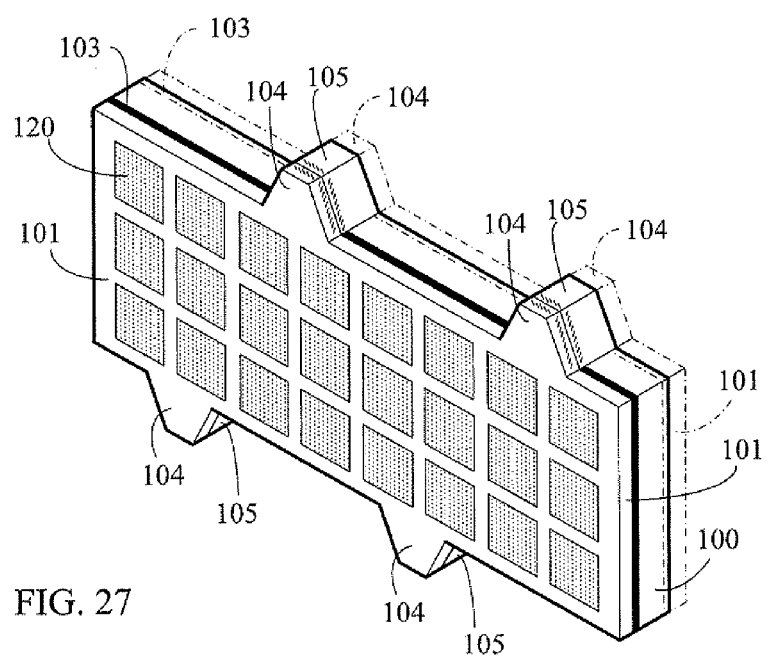
FIG. 27 is a three-dimensional structural schematic view showing an electrode unit constituted by an auxiliary conductor, in which two input/output current collecting terminals are installed at each of two sides thereof, and which is joined to electrode plate(s) with a same polarity, in which two current collecting terminals are installed at each of two sides thereof according to the present invention.

For the reserve power supply with electrode plates joined to auxiliary conductors, in practical application, two or more sides of the auxiliary conductor are individually placed with one or more current collecting terminals, and unilaterally or bilaterally joined to the electrode plate with same polarity, which is installed with one or more current collecting terminals at two or more sides; the one or more current collecting terminals placed at each of the two or more sides are unilaterally or multilaterally parallel connected, and the insulators are installed between the both for constituting the electrode unit with a variety of geometric shapes; as follows:

FIG. 27 is a three-dimensional structural schematic view showing an electrode unit constituted by the auxiliary conductor, in which two input/output current collecting terminals installed at each of two sides thereof, and joined to electrode plate(s) with same polarity, in which two current collecting terminals are installed at each of two sides thereof, at one of two or more outer sides of the auxiliary conductor, and an insulator is sandwiched therein, respectively, according to the present invention.

Figure 28:
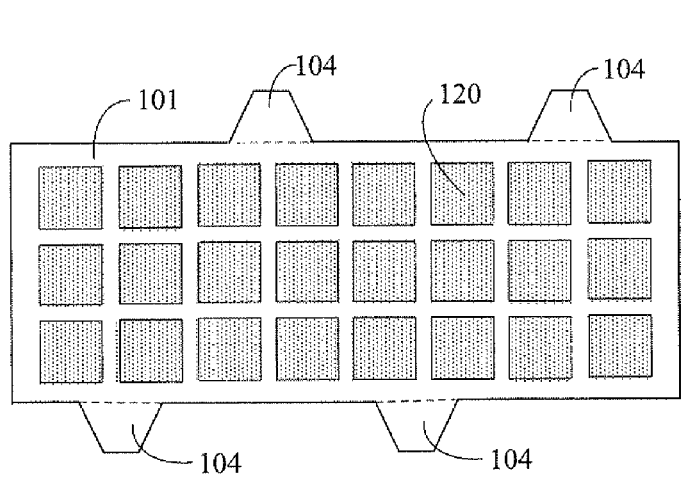
FIG. 28 is a front view of FIG. 27.

FIG. 28 is a front view of FIG. 27.

Figure 29:
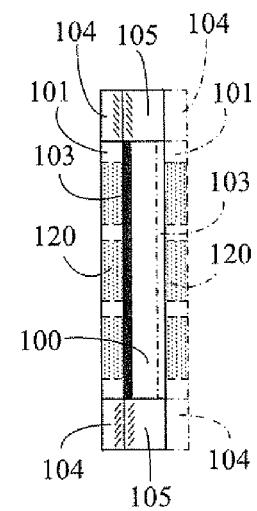
FIG. 29 is a side view of FIG. 27.

FIG. 29 is a side view of FIG. 27.

As shown in FIGS. 27, 28, and 29, an electrode unit is constituted by an auxiliary conductor, in which two input/output current collecting terminals are installed at each of two sides thereof and joined to electrode plate(s) with same polarity, in which two current collecting terminals are installed at each of two sides thereof, at one of two or more outer sides of the auxiliary conductor, and an insulator is sandwiched therein, respectively, according to the present invention.

Figure 30:
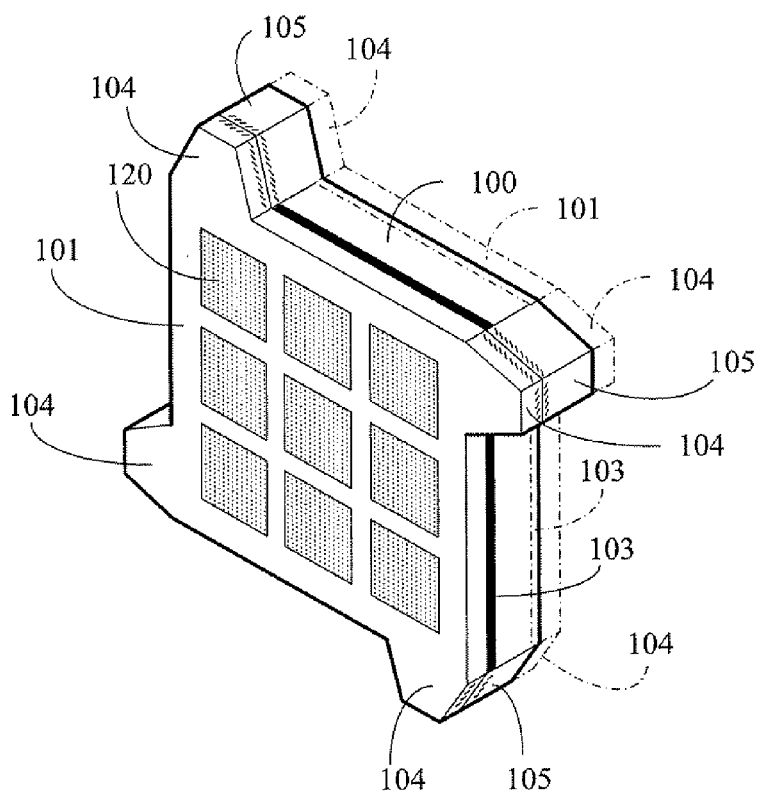
FIG. 30 is a three-dimensional structural schematic view showing an electrode unit constituted by an auxiliary conductor, in which a current collecting terminal is installed at each of four sides thereof, the auxiliary conductor joined to electrode plate(s) with a same polarity, in which a current collecting terminal is also installed at each of four sides thereof according to the present invention.

FIG. 30 is a three-dimensional structural schematic view showing the electrode unit constituted by the auxiliary conductor, in which a current collecting terminal is installed at each of four sides thereof and joined to the electrode plate(s) with same polarity, in which a current collecting terminal is installed at each of four sides thereof, at one of two or more outer sides of the auxiliary conductor, and an insulator is sandwiched therein, respectively, according to the present invention.

Figure 31:
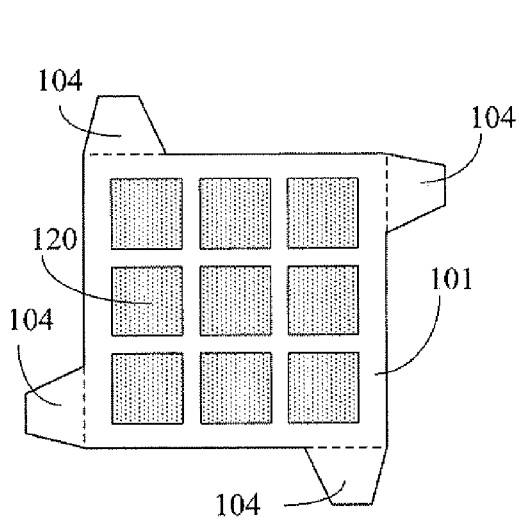
FIG. 31 is a front view of FIG. 30.

FIG. 31 is a front view of FIG. 30.

Figure 32:
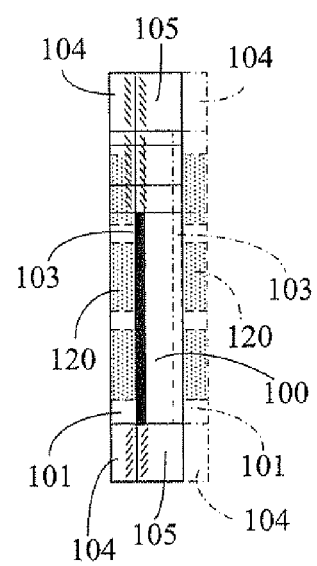
FIG. 32 is a side view of FIG. 30.

FIG. 32 is a side view of FIG. 30.

As shown in FIGS. 30, 31, and 32, the electrode unit is constituted by an auxiliary conductor having current collecting terminals installed at each of four sides thereof, and joined to electrode plate(s) with same polarity, in which a current collecting terminal is installed at each of four sides thereof, at one of two or two outer sides of the auxiliary conductor, and an insulator is sandwiched therein, respectively.

Figure 33:
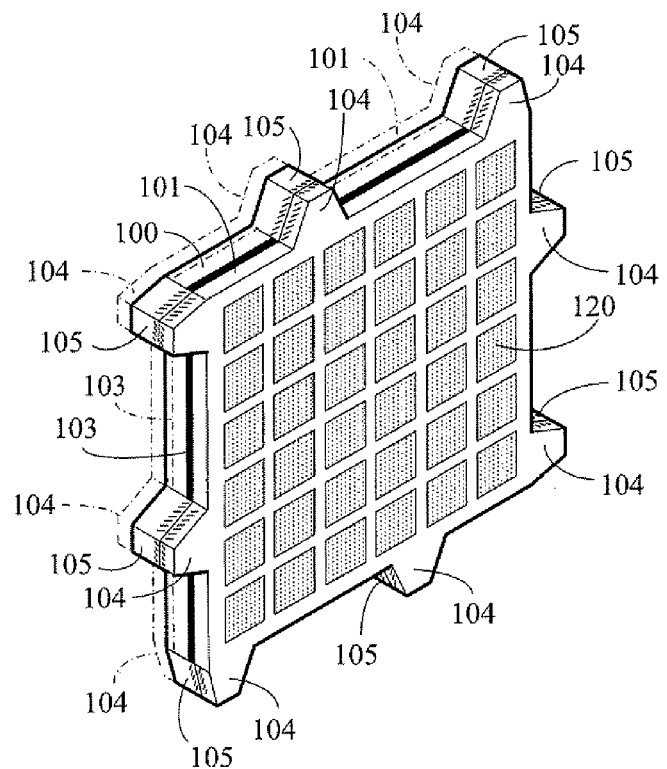
FIG. 33 is a three-dimensional structural schematic view showing an electrode unit constituted by an auxiliary conductor, in which two current collecting terminals are installed at each of four sides thereof, the auxiliary conductor joined to electrode plate(s) with a same polarity, in which two current collecting terminals are installed at each of four sides thereof according to the present invention.

FIG. 33 is a three-dimensional structural schematic view showing the electrode unit constituted by the auxiliary conductor, in which two current collecting terminals are installed at each of four sides thereof and joined to the electrode plate(s) with same polarity, and in which two current collecting terminals are installed at each of four sides thereof, at one of two or more outer sides of the auxiliary conductor, and an insulator is sandwiched therein, respectively, according to the present invention.

Figure 34:
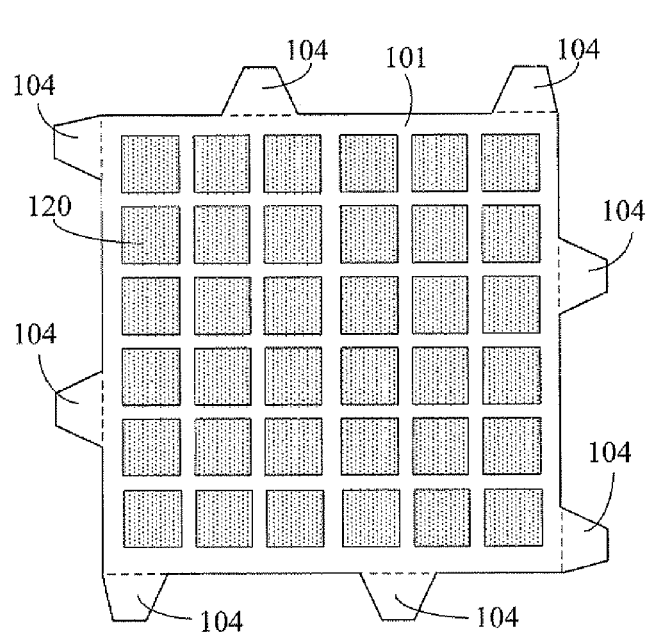
FIG. 34 is a front view of FIG. 33.

FIG. 34 is a front view of FIG. 33.

Figure 35:
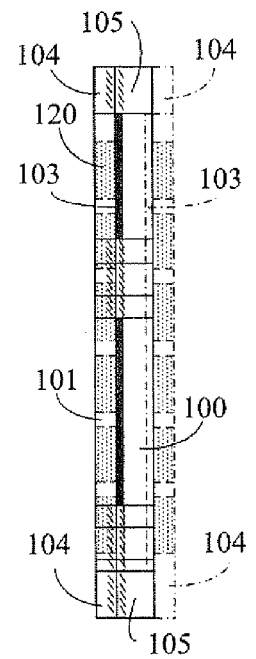
FIG. 35 is a side view of FIG. 33.

FIG. 35 is a side view of FIG. 33.

As shown in FIGS. 33, 34, and 35, the electrode unit is constituted by the auxiliary conductor, in which two current collecting terminals are installed at each of four sides thereof and joined to the electrode plate(s) with same polarity, and in which two current collecting terminals are installed at each of four sides thereof, at one of two or two outer sides of the auxiliary conductor, and an insulator is sandwiched therein, respectively.

Figure 36:
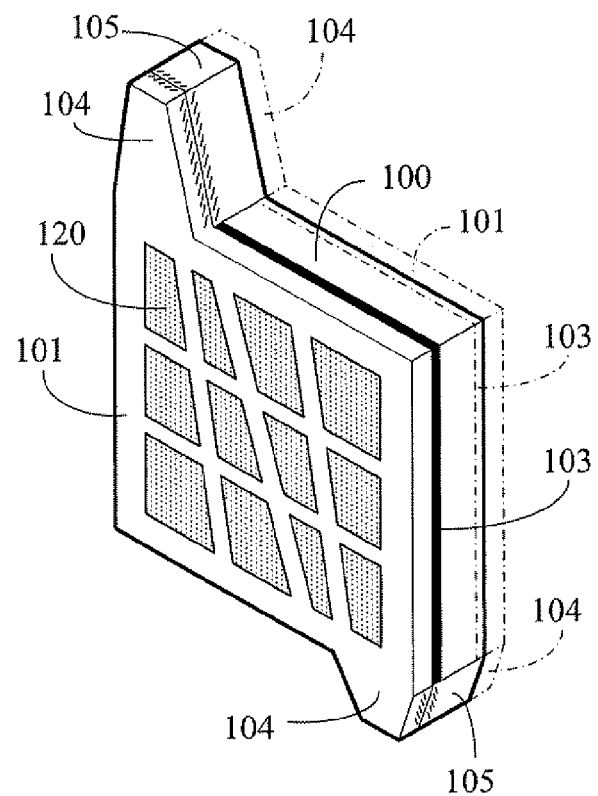
FIG. 36 is a schematic structural view showing an embodiment in which the conductor is radial and the electrode unit has a grid layout, according to the present invention.

FIG. 36 is a schematic structural view showing an embodiment of application, in which the conductor is radial and the electrode unit has a grid layout, according to the present invention.

Figure 37:
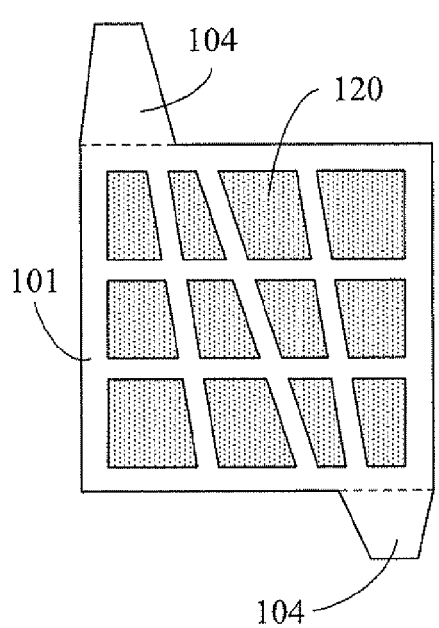
FIG. 37 is a front view of FIG. 36.

FIG. 37 is a front view of FIG. 36.

Figure 38:
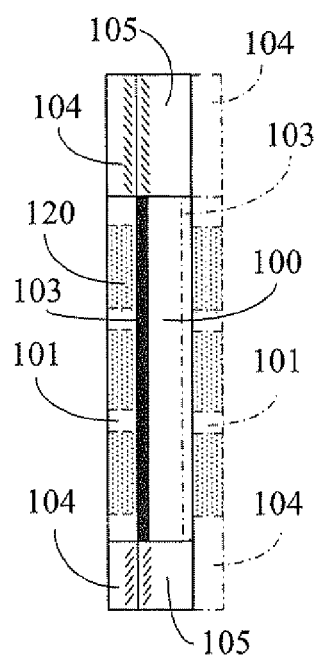
FIG. 38 is a side view of FIG. 36.

FIG. 38 is a side view of FIG. 36.

As shown in FIGS. 36, 37, and 38, the structure of the reserve power supply with electrode plates joined to auxiliary conductors is constituted by a radial conductor and a grid layout electrode unit.

Figure 39:
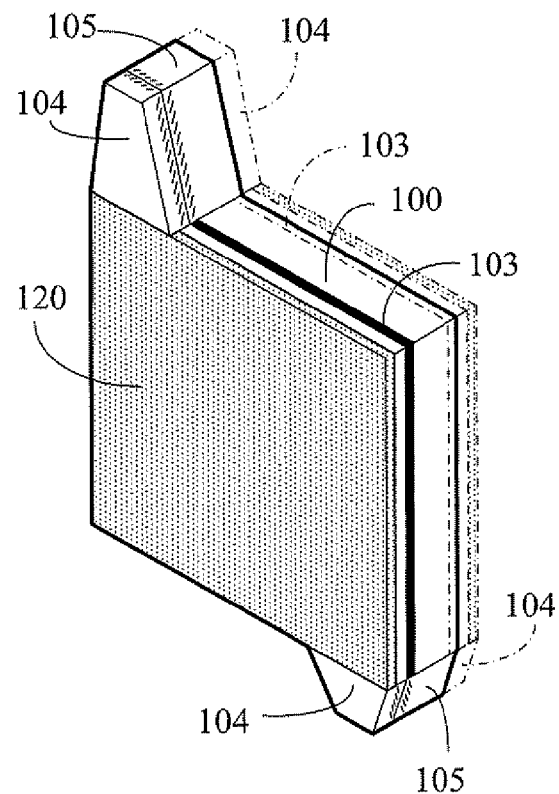
FIG. 39 is a schematic structural view showing an embodiment in which the electrode unit is plate type, according to the present invention.

FIG. 39 is a schematic structural view showing an embodiment of application, in which the electrode unit is a plate type electrode unit, according to the present invention.

Figure 40:
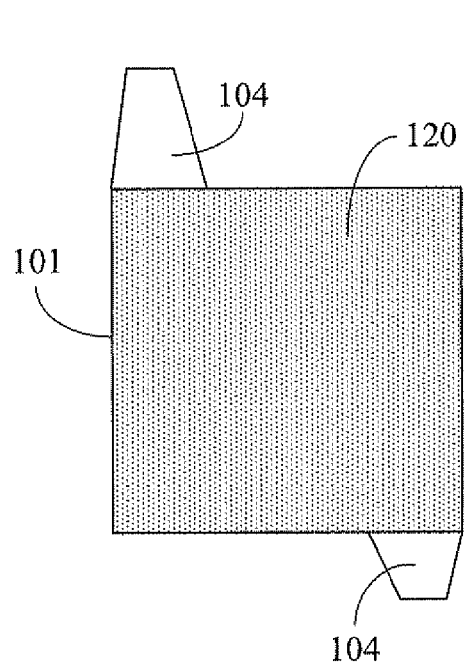
FIG. 40 is a front view of FIG. 39.

FIG. 40 is a front view of FIG. 39.

Figure 41:
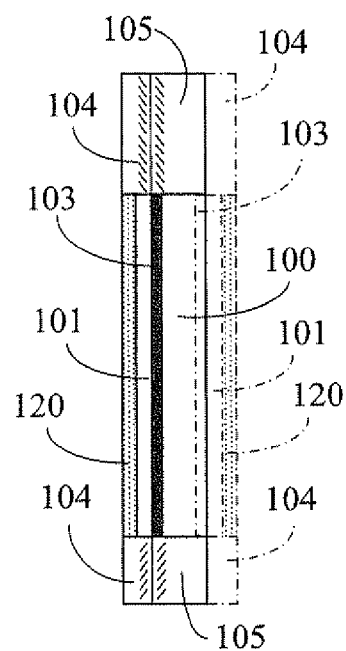
FIG. 41 is a side view of FIG. 39.

FIG. 41 is a side view of FIG. 39.

As shown in FIGS. 39, 40, and 41, the structure of the reserve power supply with electrode plates joined to auxiliary conductors is constituted by a plate type electrode unit.

Figure 42:
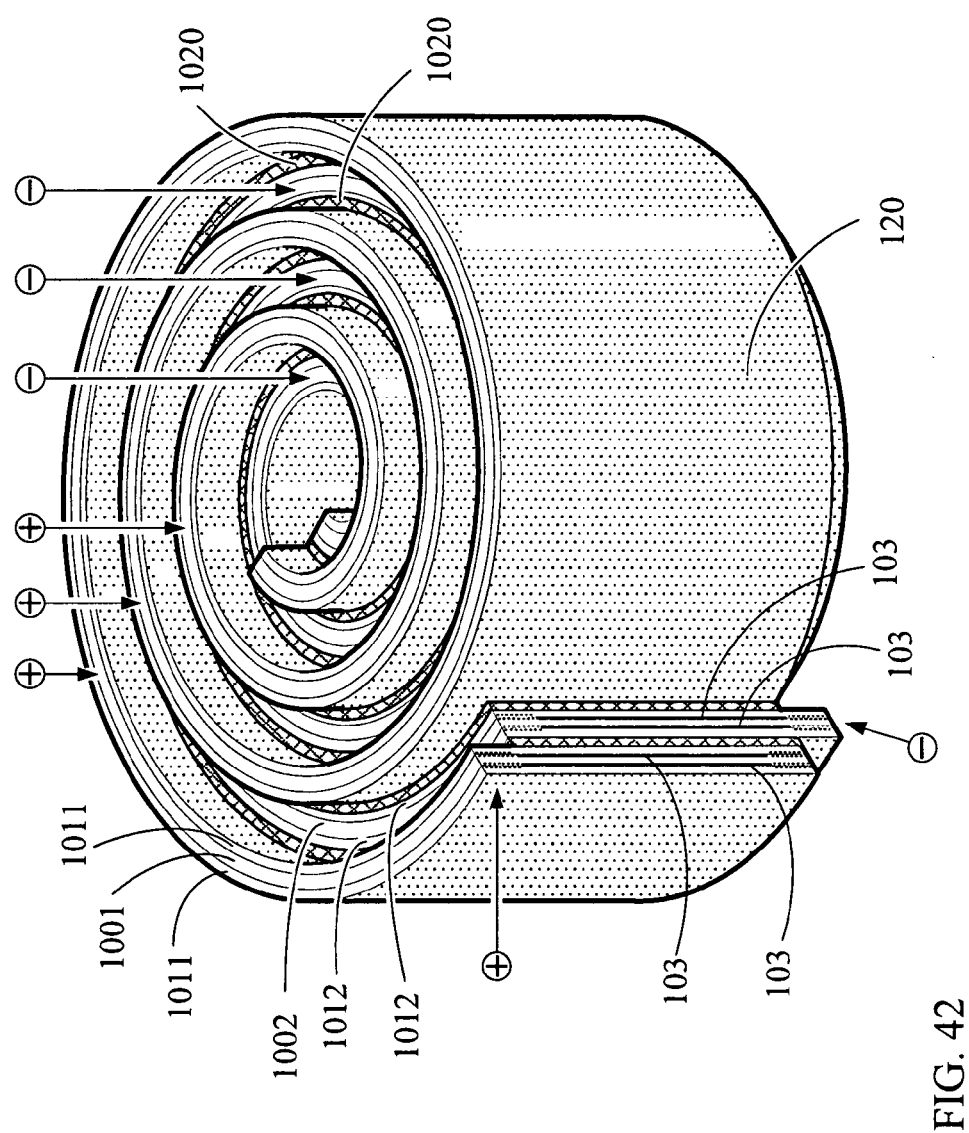
FIG. 42 is a schematic view showing an embodiment in which the electrode unit is used in a winding type reserve power supply, according to the present invention.

FIG. 42 is a schematic view showing an embodiment of application, in which the electrode unit is used to be a winding type reserve power supply, according to the present invention.

Figure 43:
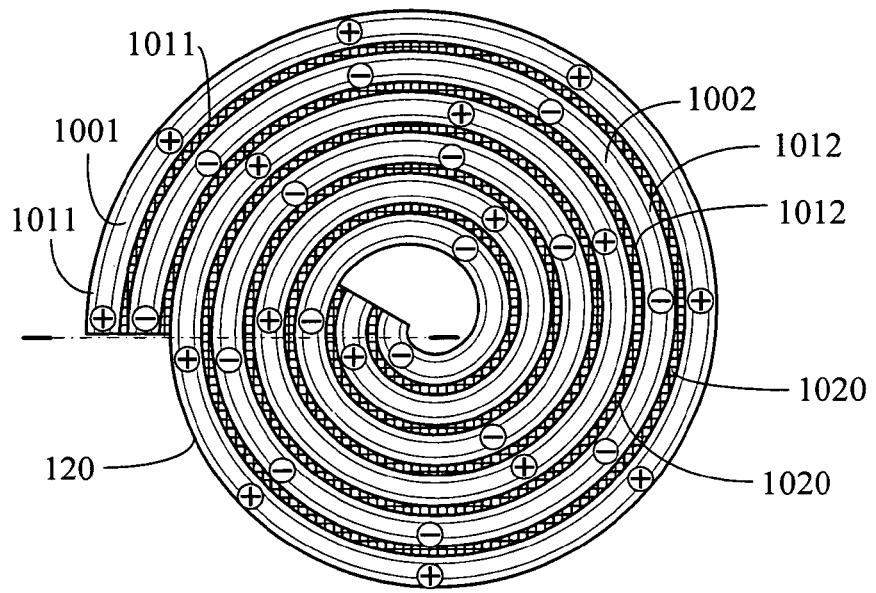
FIG. 43 is a top view of FIG. 42.

FIG. 43 is a top view of FIG. 42.

Figure 44:
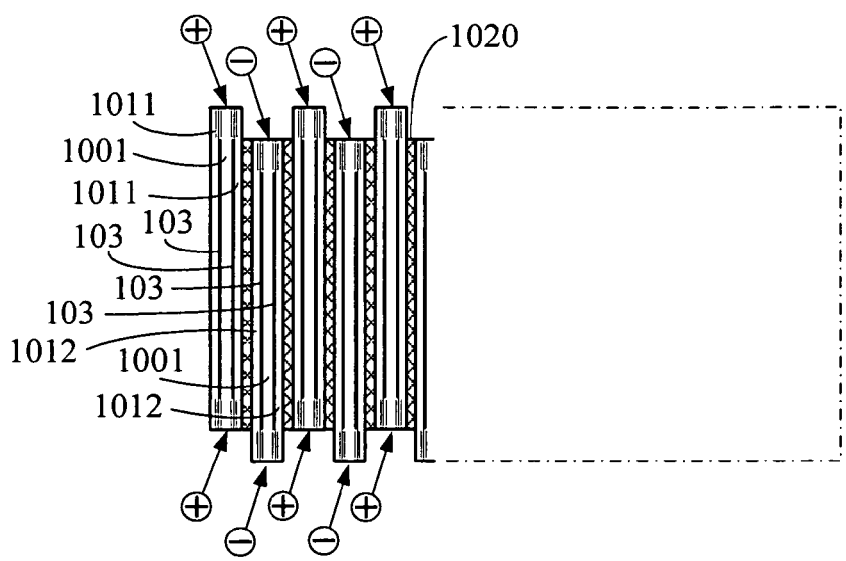
FIG. 44 is a side view of FIG. 42.

FIG. 44 is a side view of FIG. 42.

As shown in FIGS. 42, 43, and 44, the structure of the reserve power supply with electrode plates joined to auxiliary conductors is constituted by a winding type electrode unit.

The invention claimed is:

1. An electrode unit for a reserve power supply, comprising:
    at least one electrode plate (101) having at least one current collecting terminal (104) extending from each of at least two sides of the at least one electrode plate (101), said at least one electrode plate (101) having an active surface on which is coated an active substance (120); and
    at least one auxiliary conductor (100) having a conductivity higher than a conductivity of the at least one electrode plate (101), said at least one auxiliary conductor (100) having at least one current collecting terminal (105) extending from each of at least two sides of the at least one auxiliary conductor (100); and
    an insulator (103) sandwiched between and joined to the at least one electrode plate (101) and to the at least one auxiliary conductor (100) to form said electrode unit,
    wherein said at least one current collecting terminal (104) extending from each of at least two sides of the electrode plate (101) and said at least one current collecting terminal (105) extending from each of at least two sides of the auxiliary conductor (100) are electrically connected to form at least two common input/output terminals on opposite sides of the electrode unit.

2. An electrode unit for a reserve power supply as claimed in claim 1, wherein said at least one auxiliary conductor (100) is one of a planar structure, a strip structure, and a mesh structure.

3. An electrode unit for a reserve power supply as claimed in claim 1, wherein said reserve power supply is one of a primary battery, rechargeable battery, capacitor, and super capacitor.

4. An electrode unit for a reserve power supply as claimed in claim 1, wherein said input/output terminals have a same polarity.

5. An electrode unit for a reserve power supply as claimed in claim 1, wherein one said current collecting terminal (104) and one said current collecting terminal (105) extend from each of four sides of the respective electrode plate (101) and auxiliary conductor (100) to form input/out terminals on each of four sides of said electrode unit.

6. A reserve power supply, comprising:
an anode unit that includes:
at least one anode electrode plate (1011) having at least one current collecting anode terminal (1041) extending from each of at least two sides of the at least one anode electrode plate (1011), said at least one anode electrode plate (1011) having an anode active surface on which is coated an active anode substance (120); and
at least one anode auxiliary conductor (1001) having a conductivity higher than a conductivity of the at least one anode electrode plate (1011), said at least one anode auxiliary conductor (1001) having at least one current collecting anode terminal (1051) extending from each of at least two sides of the at least one anode auxiliary conductor (1001); and
an anode unit insulator (103) sandwiched between and joined to the at least one anode electrode plate (1011) and to the at least one anode auxiliary conductor (1001) to form the anode unit,
wherein said at least one current collecting anode terminal (1041) extending from each of at least two sides of the anode electrode plate (1011) and said at least one current collecting anode terminal (1051) extending from each of at least two sides of the anode auxiliary conductor (1001) are electrically connected to form common input/output terminals on the two sides the anode unit;
a cathode unit that includes:
at least one cathode electrode plate (1012) having at least one current collecting cathode terminal (1042) extending from each of at least two sides of the at least one cathode electrode plate (1012), said at least one cathode electrode plate (1012) having a cathode active surface on which is coated an active cathode substance (120); and
at least one cathode auxiliary conductor (1002) having a conductivity higher than a conductivity of the at least one cathode electrode plate (1012), said at least one cathode auxiliary conductor (1002) having at least one current collecting cathode terminal (1052) extending from each of at least two sides of the at least one cathode auxiliary conductor (1002); and
a cathode unit insulator (103) sandwiched between and joined to the at least one cathode electrode plate (1012) and to the at least one cathode auxiliary conductor (1002) to form the cathode unit,
wherein said at least one current collecting cathode terminal (1042) extending from each of at least two sides of the cathode electrode plate (1012) and said at least one current collecting cathode terminal (1052) extending from each of at least two sides of the cathode auxiliary conductor (1002) are electrically connected to form at least one common input/output terminals on the two sides of the cathode unit; and
an isolating body (1020) sandwiched between and joined to the anode unit and the cathode unit to form an integrated electrode pair, said integrated electrode pair being installed in an electrode tank (1030) of said reserve power supply.

7. A reserve power supply as claimed in claim 6, comprising two of said cathode units joined by respective said insulating bodies (1020) to opposite lateral surfaces of said anode unit,
wherein each said cathode unit include two said cathode electrode plates (1012) coated with said active cathode substance (120) and joined to said cathode auxiliary conductor (1002) by respective said cathode unit insulators (103), said cathode unit insulators (103) being respectively installed between an intermediate section of said cathode electrode plate (1012) and an intermediate section of the cathode auxiliary conductor (1002), and said current collecting cathode terminals (1042) of said cathode electrode plates (1012) and said current collecting cathode terminals (1052) of said cathode auxiliary conductor (1002) are electrically connected to form said common cathode input/output terminals,
wherein said anode units include two said anode electrode plates (1011) coated with said active anode substance (120) and joined to said anode auxiliary conductor (1001) by respective said anode unit insulators (103), said anode unit insulators (103) being respectively installed between an intermediate section of said anode electrode plate (1011) and an intermediate section of the anode auxiliary conductor (1001), and said current collecting anode terminals (1041) of said anode electrode plates (1011) and said current collecting anode terminals (1051) of said anode auxiliary conductor (1001) are electrically connected to form said common anode input/output terminals, and
wherein said common cathode input/output terminals of said two cathode units are further electrically connected to each other.

8. A reserve power supply as claimed in claim 6, comprising two of said anode units joined by respective said insulating bodies (1020) to opposite lateral surfaces of said cathode unit,
wherein each said anode unit include two said anode electrode plates (1011) coated with said active anode substance (120) and joined to said anode auxiliary conductor (1001) by respective said anode unit insulators (103), said anode unit insulators (103) being respectively installed between an intermediate section of said anode electrode plate (1011) and an intermediate section of the anode auxiliary conductor (1001), and said current collecting anode terminals (1041) of said anode electrode plates (1011) and said current collecting anode terminals (1051) of said anode auxiliary conductor (1001) are electrically connected to form said common anode input/output terminals,
wherein said cathode unit includes two said cathode electrode plates (1012) coated with said active cathode substance (120) and joined to said cathode auxiliary conductor (1002) by respective said cathode unit insulators (103), said cathode unit insulators (103) being respectively installed between an intermediate section of said cathode electrode plate (1012) and an intermediate section of the cathode auxiliary conductor (1002), and said current collecting cathode terminals (1042) of said cathode electrode plates (1012) and said current collecting cathode terminals (1052) of said cathode auxiliary conductor (1002) are electrically connected to form said common cathode input/output terminals, and
wherein said common anode input/output terminals of said two anode units are further electrically connected to each other.

9. A reserve power supply as claimed in claim 6, comprising two of said cathode units joined by respective said insulating bodies (1020) to opposite lateral surfaces of said anode unit, wherein each said cathode unit include one said cathode electrode plate (1012) coated with said active cathode substance (120) and joined to said cathode auxiliary conductor (1002) by said cathode unit insulator (103), said cathode unit insulator (103) being installed between an intermediate section of said cathode electrode plate (1012) and an intermediate section of the cathode auxiliary conductor (1002), and said current collecting cathode terminals (1042) of said cathode electrode plate (1012) and said current collecting cathode terminals (1052) of said cathode auxiliary conductor (1002) are electrically connected to form said common cathode input/output terminals, wherein said anode unit includes two said anode electrode plates (1011) coated with said active anode substance (120) and joined to said anode auxiliary conductor (1001) by respective said anode unit insulators (103), said anode unit insulators (103) being respectively installed between an intermediate section of said anode electrode plate (1011) and an intermediate section of the anode auxiliary conductor (1001), and said current collecting anode terminals (1041) of said anode electrode plates (1011) and said current collecting anode terminals (1051) of said anode auxiliary conductor (1001) are electrically connected to form said common anode input/output terminals, and wherein said common cathode input/output terminals of said two cathode units are further electrically connected to each other.

10. A reserve power supply as claimed in claim 6, comprising two of said anode units joined by respective said insulating bodies (1020) to opposite lateral surfaces of said cathode unit, wherein each said anode unit include one said anode electrode plate (1011) coated with said active anode substance (120) and joined to said anode auxiliary conductor (1001) by said anode unit insulator (103), said anode unit insulator (103) being installed between an intermediate section of said anode electrode plate (1011) and an intermediate section of the anode auxiliary conductor (1001), and said current collecting anode terminals (1041) of said anode electrode plate (1011) and said current collecting anode terminal (1051) of said anode auxiliary conductor (1001) are electrically connected to form said common anode input/output terminals, wherein said cathode unit includes two said cathode electrode plates (1012) coated with said active cathode substance (120) and joined to said cathode auxiliary conductor (1002) by respective said cathode unit insulators (103), said cathode unit insulators (103) being respectively installed between an intermediate section of said cathode electrode plate (1012) and an intermediate section of the cathode auxiliary conductor (1002), and said current collecting cathode terminals (1042) of said cathode electrode plates (1012) and said current collecting cathode terminals (1052) of said cathode auxiliary conductor (1002) are electrically connected to form said common cathode input/output terminals, and wherein said common anode input/output terminals of said two anode units are further electrically connected to each other.

11. A reserve power supply as claimed in claim 6, comprising at least two of said cathode units and at least two of said anode units alternately joined to each other by respective said insulating bodies (1020), wherein each said cathode unit include two said cathode electrode plates (1012) coated with said active cathode substance (120) and joined to said cathode auxiliary conductor (1002) by respective said cathode unit insulators (103), said cathode unit insulators (103) being respectively installed between an intermediate section of said cathode electrode plate (1012) and an intermediate section of the cathode auxiliary conductor (1002), and said current collecting cathode terminals (1042) of said cathode electrode plates (1012) and said current collecting cathode terminals (1052) of said cathode auxiliary conductor (1002) are electrically connected to form said common cathode input/output terminals, wherein each said anode unit includes two said anode electrode plates (1011) coated with said active anode substance (120) and joined to said anode auxiliary conductor (1001) by respective said anode unit insulators (103), said anode unit insulators (103) being respectively installed between an intermediate section of said anode electrode plate (1011) and an intermediate section of the anode auxiliary conductor (1001), and said current collecting anode terminals (1041) of said anode electrode plates (1011) and said current collecting anode terminals (1051) of said anode auxiliary conductor (1001) are electrically connected to form said common anode input/output terminals, and wherein said common cathode input/output terminals of said at least two cathode units are electrically connected to each other and said common anode input/output terminals of said at least two anode units are also electrically connected to each other.

12. A reserve power supply as claimed in claim 11, wherein one of said common cathode input/output terminals at an intermediate position in said series of said alternating cathode and anode units, and one of said common anode input/output terminals at an intermediate position in said series of alternating cathode and anode units, serve as respective general collecting current terminals for input and output of current between said reserve power supply and an external device.

13. A reserve power supply as claimed in claim 12, wherein said general collecting current terminals are exposed to an outside of said tank (1030) and remaining said common anode input/output terminals and common cathode input/output terminals are hidden within said tank (1030).

14. A reserve power supply as claimed in claim 11, wherein a respective said common anode input/output terminals of said end cathode and anode units serve as respective general collecting current terminals for input and output of current between said reserve power supply and an external device.

15. A reserve power supply as claimed in claim 14, wherein said general collecting current terminals are exposed to an outside of said tank (1030) and remaining said common anode input/output terminals and common cathode input/output terminals are hidden within said tank (1030).

16. A reserve power supply as claimed in claim 6, comprising at least two of said cathode units and at least two of said anode units alternately joined to each other by respective said insulating bodies (1020), wherein one of said cathode units at an end of a series of said alternating anode and cathode units includes one said cathode electrode plate (1012) coated with said active cathode substance (120) and joined to said cathode auxiliary conductor (1002) by said cathode unit insulator (103), said cathode unit insulator (103) being installed between an intermediate section of said cathode electrode plate (1012) and an intermediate section of the cathode auxiliary conductor (1002), and said current collecting cathode terminals (1042) of said cathode electrode plate (1012) and said current collecting cathode terminals (1052) of said cathode auxiliary conductor (1002) are electrically connected to form said common cathode input/output terminals, wherein each of said cathode units except said end cathode unit includes two said cathode electrode plates (1012) coated with said active cathode substance (120) and joined to said cathode auxiliary conductor (1002) by respective said cathode unit insulators (103), said cathode unit insulators (103) being respectively installed between an intermediate section of said cathode electrode plate (1012) and an intermediate section of the cathode auxiliary conductor (1002), and said current collecting cathode terminals (1042) of said cathode electrode plates (1012) and said current collecting cathode terminals (1052) of said cathode auxiliary conductor (1002) are electrically connected to form said common cathode input/output terminals, wherein one of said anode units at an opposite end of said series of alternating anode and cathode units include one said anode electrode plate (1011) coated with said active anode substance (120) and joined to said anode auxiliary conductor (1001) by said anode unit insulator (103), said anode unit insulator (103) being installed between an intermediate section of said anode electrode plate (1011) and an intermediate section of the anode auxiliary conductor (1001), and said current collecting anode terminals (1041) of said anode electrode plate (1011) and said current collecting anode terminals (1051) of said anode auxiliary conductor (1001) are electrically connected to form said common anode input/output terminals, wherein each said anode unit except said end anode unit includes two said anode electrode plates (1011) coated with said active anode substance (120) and joined to said anode auxiliary conductor (1001) by respective said anode unit insulators (103), said anode unit insulators (103) being respectively installed between an intermediate section of said anode electrode plate (1011) and an intermediate section of the anode auxiliary conductor (1001), and said current collecting anode terminals (1041) of said anode electrode plates (1011) and said current collecting anode terminals (1051) of said anode auxiliary conductor (1001) are electrically connected to form said common anode input/output terminals, and wherein said common cathode input/output terminals of said at least two cathode units are electrically connected to each other and said common anode input/output terminals of said at least two anode units are also electrically connected to each other.

17. A reserve power supply as claimed in claim 16, wherein one of said common cathode input/output terminals at an intermediate position in said series of said alternating cathode and anode units, and one of said common anode input/output terminals at an intermediate position in said series of alternating cathode and anode units, serve as respective general collecting current terminals for input and output of current between said reserve power supply and an external device.

18. A reserve power supply as claimed in claim 17, wherein said general collecting current terminals are exposed to an outside of said tank (1030) and remaining said common anode input/output terminals and common cathode input/output terminals are hidden within said tank (1030).

19. A reserve power supply as claimed in claim 16, wherein a respective said common anode input/output terminals of said end cathode and anode units serve as respective general collecting current terminals for input and output of current between said reserve power supply and an external device.

20. A reserve power supply as claimed in claim 19, wherein said general collecting current terminals are exposed to an outside of said tank (1030) and remaining said common anode input/output terminals and common cathode input/output terminals are hidden within said tank (1030).

21. A reserve power supply as claimed in claim 6, comprising one said cathode unit and one said anode unit joined to each other by one said insulating body (1020), wherein said cathode unit include two said cathode electrode plates (1012) coated with said active cathode substance (120) and joined to said cathode auxiliary conductor (1002) by respective said cathode unit insulators (103), said cathode unit insulators (103) being respectively installed between an intermediate section of said cathode electrode plate (1012) and an intermediate section of the cathode auxiliary conductor (1002), and said current collecting cathode terminals (1042) of said cathode electrode plates (1012) and said current collecting cathode terminals (1052) of said cathode auxiliary conductor (1002) are electrically connected to form said common cathode input/output terminals, wherein said anode unit include one said anode electrode plate (1011) coated with said active anode substance (120) and joined to said anode auxiliary conductor (1001) by said anode unit insulator (103), said anode unit insulator (103) being installed between an intermediate section of said anode electrode plate (1011) and an intermediate section of the anode auxiliary conductor (1001), and said current collecting anode terminal (1041) of said anode electrode plate (1011) and said current collecting anode terminals (1051) of said anode auxiliary conductor (1001) are electrically connected to form said common anode input/output terminals.

22. A reserve power supply at claimed in claim 21, further comprising at least one monolithic anode plate (1031) having a positive terminal (601) and joined to the cathode unit by a second said insulating body (1020), and at least one monolithic cathode plate (1032) having a negative terminal (602) and joined to said anode unit by a third said insulating body (1020), said positive terminal (601) being electrically connected to the common input/output terminal of the anode unit and said negative terminal being electrically connected to the common input/output terminal of the cathode unit.

23. A reserve power supply at claimed in claim 21, further comprising additional said monolithic anode plates (1031) and monolithic cathode plates (1032) stacked in alternating fashion on each side of said joined-together anode unit and cathode unit.

24. A reserve power supply as claimed in claim 6, wherein said tank (1030) is divided into multiple cells, each containing one cathode unit and one anode unit.

* * * * *